United States Patent
Sato et al.

(10) Patent No.: US 8,425,319 B2
(45) Date of Patent: Apr. 23, 2013

(54) DIRECTION CONTROL SYSTEM, DIRECTION CONTROL APPARATUS, STORAGE MEDIUM HAVING DIRECTION CONTROL PROGRAM STORED THEREIN, AND DIRECTION CONTROL METHOD

(75) Inventors: Kenta Sato, Kyoto (JP); Hiromasa Shikata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/277,524

(22) Filed: Oct. 20, 2011

(65) Prior Publication Data

US 2012/0302344 A1 Nov. 29, 2012

(30) Foreign Application Priority Data

May 23, 2011 (JP) .................................. 2011-115098

(51) Int. Cl.
*A63F 9/24* (2006.01)

(52) U.S. Cl.
USPC .............................................. 463/37; 463/38

(58) Field of Classification Search .................. 345/157; 463/35, 37–38; 715/706
See application file for complete search history.

(56) References Cited

U.S. PATENT DOCUMENTS

| | | | |
|---|---|---|---|
| 6,257,983 B1* | 7/2001 | Rimoto | 463/38 |
| 2003/0216179 A1* | 11/2003 | Suzuki et al. | 463/35 |
| 2008/0211768 A1* | 9/2008 | Breen et al. | 345/157 |
| 2008/0215973 A1* | 9/2008 | Zalewski et al. | 715/706 |
| 2010/0081507 A1* | 4/2010 | Finocchio | 463/37 |

* cited by examiner

*Primary Examiner* — Dmitry Suhol
*Assistant Examiner* — Jason Yen
(74) *Attorney, Agent, or Firm* — Nixon & Vanderhye P.C.

(57) ABSTRACT

An example game apparatus determines, when an input has been made with a cross button, whether an input direction indicates a diagonal direction. When the input direction indicates a diagonal direction, a follow parameter is set such that a virtual stick vector is changed so as to slowly approach an input vector. When the input direction does not indicate a diagonal direction, the follow parameter is set such that the virtual stick vector is changed so as to approach the input vector fast. Further, the game apparatus calculates the follow parameter according to an inner product of the virtual stick vector and the input vector. The game apparatus updates the virtual stick vector based on the virtual stick vector having been most recently obtained, the input vector, and the follow parameter.

20 Claims, 15 Drawing Sheets

F I G. 1 0
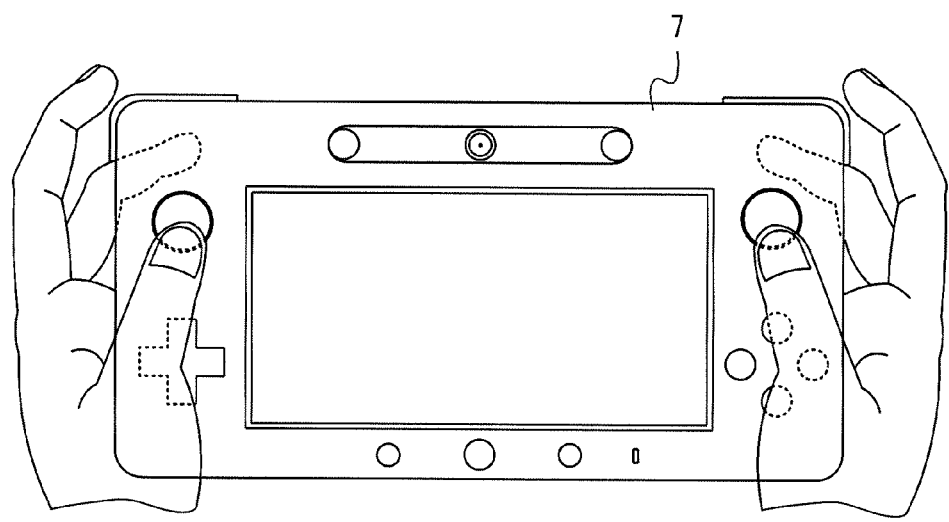

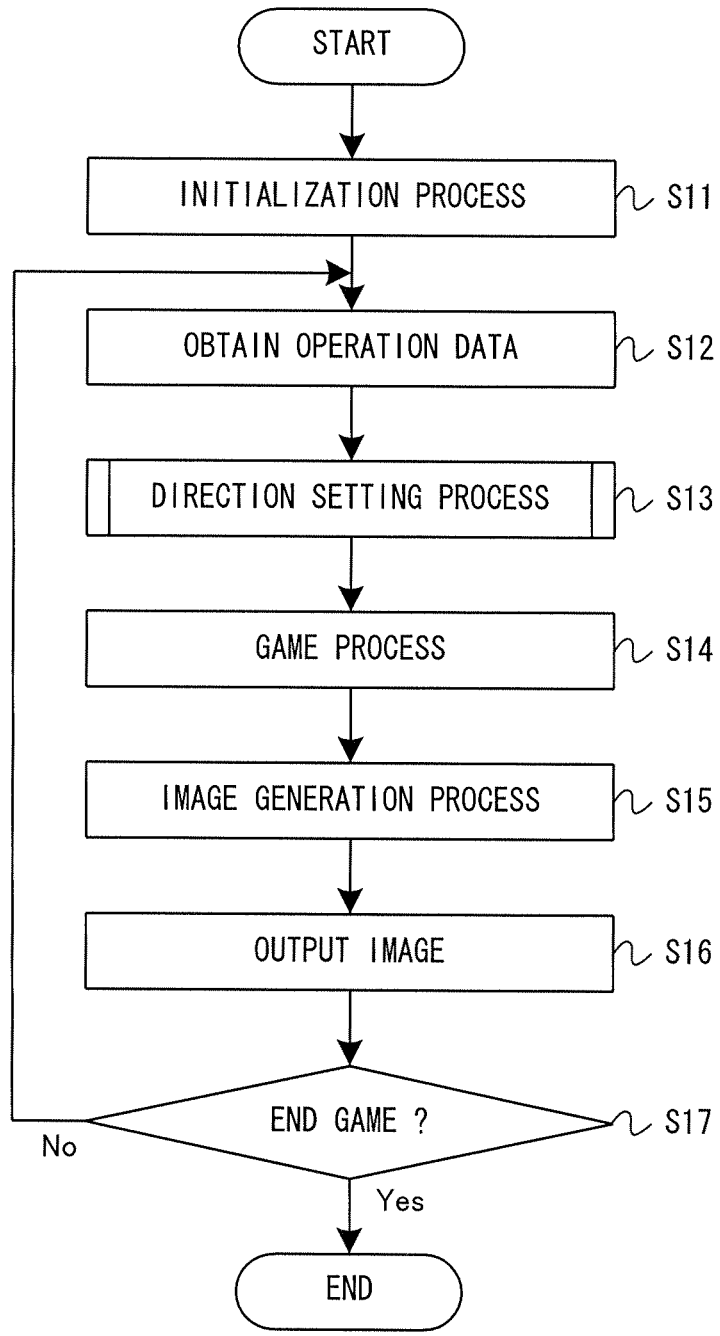
F I G. 1 6

DIRECTION CONTROL SYSTEM, DIRECTION CONTROL APPARATUS, STORAGE MEDIUM HAVING DIRECTION CONTROL PROGRAM STORED THEREIN, AND DIRECTION CONTROL METHOD

CROSS REFERENCE TO RELATED APPLICATION

The disclosure of Japanese Patent Application No. 2011-115098, filed on May 23, 2011, is incorporated herein by reference.

FIELD

The exemplary embodiments relate to a direction control system, a direction control apparatus, a storage medium having a direction control program stored therein, and a direction control method, in which a four direction switch is used.

BACKGROUND AND SUMMARY

Game apparatuses each of which includes an input device having a four direction switch, and which is operable to move a predetermined object according to an input onto the four direction switch, have been known to date.

The number of directions which can be designated by an input using the four direction switch is eight. When a player controls a moving direction of a player character by using the four direction switch, it is difficult to move the player character in a desired direction. In this case, a manner can be considered in which a virtual analog stick is defined in a game apparatus, and a direction represented by the virtual analog stick is changed according to an input onto the four direction switch, and the player character is controlled by using the direction represented by the virtual analog stick. Specifically, in this manner, when an input is made with the four direction switch, the direction represented by the virtual analog stick is gradually changed so as to approach a direction inputted onto the four direction switch over a predetermined time period. However, in this method, the player cannot always move the player character as intended by the player. Thus, there is room for improvement in direction input using the four direction switch.

Therefore, a feature of certain exemplary embodiments is to make available a direction control system, a direction control apparatus, a storage medium having a direction control program stored therein, and a direction control method, whereby operability for a user can be improved in the case of a direction being inputted by using a four direction switch.

Certain exemplary embodiments have the following aspects to attain the feature mentioned above.

One aspect of certain exemplary embodiments is to provide a direction control system for setting a first control direction based on an input onto a four direction switch representing four directions. The direction control system includes: first input direction obtaining means; determination means; and direction setting means. The first input direction obtaining means obtains a first input direction representing either a direction between two directions among the four directions, or one of the four directions, based on the input onto the four direction switch. The determination means determines whether the first input direction indicates a first direction representing one of the four directions, or a second direction representing a direction between two directions among the four directions. The direction setting means updates the first control direction based on the first input direction, and the first control direction is changed to approach the first input direction such that, when the first input direction indicates the second direction, a rate at which the first control direction is changed to approach the first input direction is reduced as compared to when the first input direction indicates the first direction.

The "four direction switch" may be, for example, a cross button. Further, the "four direction switch" may be, for example, a switch including a cross button on which the upward direction, the downward direction, the leftward direction, and the rightward direction are set so as to be diagonally oriented. For example, in the case of the cross button, the "second direction representing a direction between two directions among the four directions" is a diagonal direction represented by the cross button. In the case of the switch including a cross button on which the upward direction, the downward direction, the leftward direction, and the rightward direction are set so as to be diagonally oriented, the "second direction representing a direction between two directions among the four directions" is one of the upward direction, the downward direction, the leftward direction, and the rightward direction.

According to the structure described above, when the first input direction represented by the four direction switch indicates the second direction, a rate at which the first control direction is changed to approach the first input direction is relatively reduced, and when the first input direction indicates the first direction, the rate at which the first control direction is changed to approach the first input direction is relatively increased. Thus, also when a user moves a predetermined object by using, for example, the four direction switch, the user is allowed to move the predetermined object in a direction intended by the user.

Further, according to another aspect of certain exemplary embodiments, the direction setting means may change the rate at which the first control direction is changed to approach the first input direction, based on a difference between the first input direction and the first control direction.

According to the structure described above, the rate at which the first control direction is changed to approach the first input direction can be changed based on a difference between the first input direction and the first control direction.

Further, according to another aspect of certain exemplary embodiments, the direction setting means may set the rate at which the first control direction is changed to approach the first input direction such that the greater a difference between the first input direction and the first control direction having been most recently updated is, the higher the rate is.

According to the structure described above, the rate at which the first control direction is changed to approach the first input direction can be set such that the greater a difference between the first input direction and the first control direction having been most recently updated is, the higher the rate is. Thus, the first control direction can be set so as to reflect a user's intention with enhanced effectiveness.

Further, according to another aspect of certain exemplary embodiments, the direction control system may further include object control means for controlling a direction of a predetermined object in a virtual space, based on the first control direction.

According to the structure described above, a direction (which may be, for example, a moving direction or a line of sight direction) of a predetermined object in the virtual space can be controlled based on the first control direction.

Further, according to another aspect of certain exemplary embodiments, the direction control system may further include second input direction obtaining means for obtaining a two-dimensional second input direction based on an input onto an analog direction input section. The direction setting means sets the second input direction as a second control direction.

The second control direction and the first control direction may be the same or may be different from each other.

According to the structure described above, the second input direction can be set as the second control direction. For example, when the second control direction and the first control direction are the same, the second input direction can be set as the first control direction.

Further, according to another aspect of certain exemplary embodiments, the direction control system may include an operation device including the four direction switch and the analog direction input section. Further, the direction control system may further include object control means. The object control means controls, in accordance with an input onto the four direction switch, a direction of a predetermined object in a virtual space based on the first control direction, and controls, in accordance with an input onto the analog direction input section, a direction of the predetermined object based on the second control direction.

According to the structure described above, for example, a direction of a predetermined object can be controlled based on an input onto the four direction switch and/or the analog direction input section.

Further, according to another aspect of certain exemplary embodiments, the direction control system may include: a first operation device including the four direction switch; and a second operation device including the analog direction input section. Further, the direction control system further includes object control means. The object control means controls, in accordance with an input onto the four direction switch, a direction of a first object in a virtual space based on the first control direction, and controls, in accordance with an input onto the analog direction input section, a direction of a second object based on the second control direction.

According to the structure described above, a direction of the first object is controlled in accordance with an input onto the four direction switch of the first operation device, and a direction of the second object is controlled in accordance with an input onto the analog direction input section of the second operation device. Thus, for example, a game can be played in which the first object for which the moving direction is controlled in accordance with an input onto the four direction switch is caused to chase the second object for which the moving direction is controlled in accordance with an input onto the analog direction input section.

The direction control system may be structured by a single device, or by a plurality of devices. Further, in another exemplary embodiment, a direction control apparatus may be realized. Furthermore, a computer-readable storage medium having stored therein a direction control program for causing a computer of a direction control apparatus to functions as each means described above, may be realized. Furthermore, in another exemplary embodiment, a direction control method may be realized.

According to certain exemplary embodiments, operability for a user can be improved when a direction is inputted by using a four direction switch.

These and other features, aspects and advantages of certain exemplary embodiments will become more apparent from the following detailed description when taken in conjunction with the accompanying drawings.

BRIEF DESCRIPTION OF THE DRAWINGS

FIG. 10 shows a non-limiting exemplary state in which a user holds the terminal device 7;

FIG. 16 is a main flow chart showing a non-limiting exemplary flow of the game process executed by the game apparatus 3.

DETAILED DESCRIPTION OF NON-LIMITING EXAMPLE EMBODIMENTS

1. Overall Configuration of Game System

Figure 1:
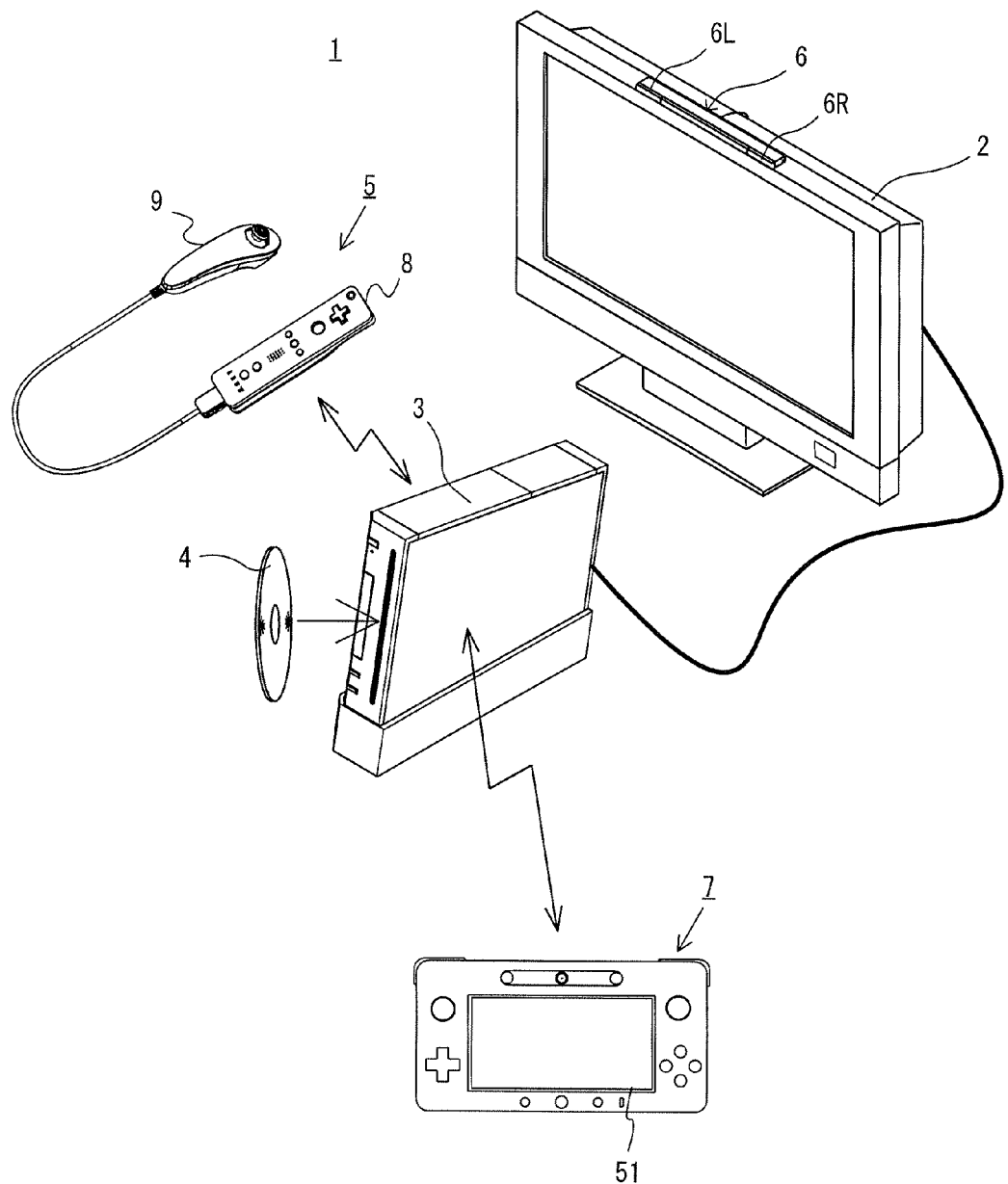
FIG. 1 is an external view showing a non-limiting example of a game system 1.

Hereinafter, a game system 1 according to an exemplary embodiment will be described with reference to the drawings. FIG. 1 is an external view showing a non-limiting example of a game system 1. As shown in FIG. 1, the game system 1 includes a stationary display device (hereinafter, referred to as a "television") 2 typified by, for example, a television receiver, a stationary game apparatus 3, an optical disc 4, a controller 5, a marker device 6, and a terminal device 7. In the game system 1, the game apparatus 3 executes a game process based on a game operation using the controller 5, and the television 2 and/or the terminal device 7 display a game image obtained in the game process.

Into the game apparatus 3, the optical disc 4 which is an exemplary information storage medium which is exchangeably used for the game apparatus 3 is detachably inserted. An information processing program (typically, a game program) to be executed by the game apparatus 3 is stored in the optical disc 4. An insertion operating for the optical disc 4 is formed on the front surface of the game apparatus 3. The game apparatus 3 loads and executes the information processing program stored in the optical disc 4 having been inserted through the insertion opening, thereby executing the game process.

The television 2 is connected to the game apparatus 3 through a connection cord. The television 2 displays a game image obtained in the game process executed by the game apparatus 3. The television 2 includes a speaker 2a (FIG. 2), and the speaker 2a outputs game sound obtained as a result of the game process. In another exemplary embodiment, the game apparatus 3 may be integrated with a stationary display device. Further, the game apparatus 3 and the television 2 may wirelessly communicate with each other.

The marker device 6 is provided in the vicinity (above a screen in FIG. 1) of a screen of the television 2. As will be described below in detail, a user (a player) is allowed to perform a game operation of moving the controller 5, and the marker device 6 is used for causing the game apparatus 3 to calculate, for example, a movement, a position, and an attitude of the controller 5. The marker device 6 includes two markers, that is, a marker 6R and a marker 6L, on both ends thereof. Specifically, the marker 6R (and the marker 6L) is implemented as at least one infrared light emitting diode (LED), and emits infrared light forward from the television 2. The marker device 6 is wire-connected (or may be wirelessly connected) to the game apparatus 3, and the game apparatus 3 is able to control whether each infrared LED of the marker device 6 is to be lit up. The marker device 6 is portable, and a user is allowed to set the marker device 6 at a desired position. In FIG. 1, an exemplary manner is shown in which the marker device 6 is set on the television 2. However, the marker device 6 may be set at any position and may face in any direction.

The controller 5 provides the game apparatus 3 with operation data based on an operation performed on the controller 5. In the exemplary embodiment described herein, the controller 5 includes a main controller 8 and a sub-controller 9, and the sub-controller 9 is detachably mounted to the main controller 8. The controller 5 and the game apparatus 3 are able to wirelessly communicate with each other. In the exemplary embodiment described herein, for example, the Bluetooth (registered trademark) technology is used for the wireless communication between the controller 5 and the game apparatus 3. In another exemplary embodiment, the controller 5 and the game apparatus 3 may be wire-connected to each other. Further, although, in FIG. 1, the number of the controllers 5 included in the game system 1 is one, the game system 1 may include a plurality of the controllers 5. Namely, the game apparatus 3 can communicate with a plurality of controllers, and multiple persons are allowed to play a game by simultaneously using a predetermined number of controllers. A specific structure of the controller 5 will be described below in detail.

The terminal device 7 approximately has such a size as to be held by a user, and the user is allowed to use the terminal device 7 by holding and moving the terminal device 7 with his/her hand, or positioning the terminal device 7 at any desired position. The terminal device 7 includes a liquid crystal display (LCD) 51 operating as display means, and input means (such as a touch panel 52 and a gyro sensor 64 as described below). The structure of the terminal device 7 will be described below in detail. The terminal device 7 and the game apparatus 3 can wirelessly communicate with each other (or wired communication may be used therebetween). The terminal device 7 receivers, from the game apparatus 3, data of an image (for example, a game image) generated by the game apparatus 3, and displays the image on the LCD 51. Although, in the exemplary embodiment described herein, an LCD is used as a display device, the terminal device 7 may have any other display device such as a display device using, for example, electro luminescence (EL). Further, the terminal device 7 transmits, to the game apparatus 3, operation data based on an operation performed on the terminal device 7.

2. Internal Structure of Game Apparatus 3

Figure 2:
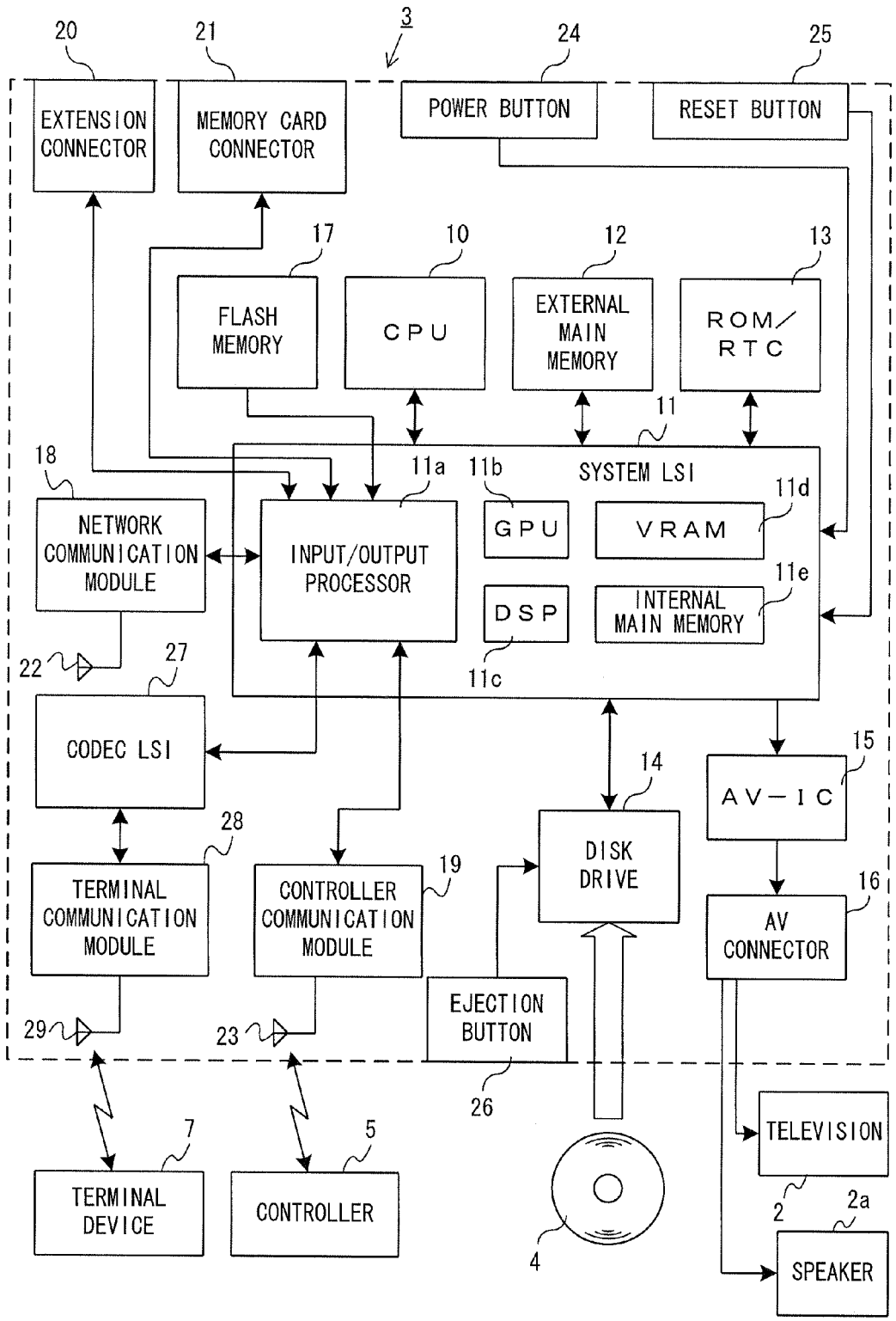
FIG. 2 is a block diagram showing a non-limiting exemplary internal structure of a game apparatus 3.

Next, with reference to FIG. 2, a non-limiting exemplary internal structure of the game apparatus 3 will be described. FIG. 2 is a block diagram showing a non-limiting exemplary internal structure of the game apparatus 3. The game apparatus 3 includes: a central processing unit (CPU) 10; a system LSI 11; an external main memory 12; a ROM/RTC 13; a disk drive 14; an AV-IC 15, and the like.

The CPU 10, serving as a game processor, executes a game program stored in the optical disc 4 to perform a game process. The CPU 10 is connected to the system LSI 11. In addition to the CPU 10, the external main memory 12, the ROM/RTC 13, the disk drive 14, and the AV-IC 15 are also connected to the system LSI 11. The system LSI 11 performs processing such as control of data transmission among respective components connected thereto, generation of an image to be displayed, and acquisition of data from an external apparatus. An internal configuration of the system LSI 11 will be described below. The external main memory 12, which is of a volatile type, stores programs, such as a game program loaded from the optical disc 4 or a flash memory 17, and various data. The external main memory 12 is used as a work area and a buffer area for the CPU 10. The ROM/RTC 13 includes a ROM (so-called a boot ROM) storing a program for starting up the game apparatus 3, and a clock circuit (real time clock: RTC) for counting time. The disk drive 14 reads, from the optical disc 4, program data, texture data and the like, and writes the read data into an internal main memory 11e described below, or the external main memory 12.

An input/output processor (I/O processor) 11a, a graphics processor unit (GPU) 11b, a digital signal processor (DSP) 11c, a VRAM (video RAM) 11d, and the internal main memory 11e, are included in the system LSI 11. These components 11a to 11e are connected to each other via an internal bus, which is not shown.

The GPU 11b, which is a part of rendering means, generates an image according to a graphics command (rendering command) from the CPU 10. The VRAM 11d stores data (such as polygon data and texture data) to be used by GPU 11b for executing the graphics command. When an image is generated, the GPU 11b generates image data by using the data stored in the VRAM 11d. In the exemplary embodiment described herein, the game apparatus 3 generates both a game image to be displayed by the television 2, and a game image to be displayed by the terminal device 7. Hereinafter, the game image to be displayed by the television 2 may be referred to as a "television game image", and the game image to be displayed by the terminal device 7 may be referred to as a "terminal game image".

The DSP 11c functions as an audio processor, and generates sound data by using sound data and sound waveform (tone quality) data stored in the internal main memory 11e and/or the external main memory 12. In the exemplary embodiment described herein, as game sounds, both a game sound outputted from the speaker of the television 2, and a game sound outputted by a speaker of the terminal device 7 are generated, similarly to the game images. Hereinafter, the game sound outputted by the television 2 may be referred to as a "television game sound", and the game sound outputted by the terminal device 7 may be referred to as a "terminal game sound".

Data of the image and the sound to be outputted by the television 2, among the images and the sounds generated by the game apparatus 3 as described above, is read by the AV-IC 15. The AV-IC 15 outputs the read data of image to the television 2 via an AV connector 16, and also outputs the read data of sound to the speaker 2a included in the television 2. Thus, the image is displayed by the television 2, and the sound is outputted from the speaker 2a.

On the other hand, data of the image and the sound to be outputted by the terminal device 7, among the images and the sounds generated by the game apparatus 3, is transmitted to the terminal device 7 by the input/output processor 11a, and/or the like. The transmission of the data to the terminal device 7 by the input/output processor 11a, and/or the like will be described below.

The input/output processor 11a executes data reception and transmission among the components connected thereto and data downloading from an external apparatus. The input/output processor 11a is connected to the flash memory 17, a network communication module 18, a controller communication module 19, an extension connector 20, a memory card connector 21, and a codec LSI 27. To the network communication module 18, an antenna 22 is connected. To the controller communication module 19, an antenna 23 is connected. The codec LSI 27 is connected to a terminal communication module 28, and an antenna 29 is connected to the terminal communication module 28.

The game apparatus 3 is connected to a network such as the Internet, so that the game apparatus 3 can communicate with an external information processing apparatus (for example, other game apparatuses, various servers, or various information processing apparatuses). Namely, the input/output processor 11a is connected to a network such as the Internet via the network communication module 18 and the antenna 22, to be able to communicate with the external information processing apparatus connected to the network. The input/output processor 11a accesses the flash memory 17 at regular intervals to detect for presence of data to be transmitted to the network. When the data to be transmitted is detected, the data is transmitted to the network via the network communication module 18 and the antenna 22. Further, the input/output processor 11a receives, via the network, the antenna 22 and the network communication module 18, data transmitted from the external information processing apparatus or data downloaded from a download server, and stores the received data in the flash memory 17. The CPU 10 executes the game program to read the data stored in the flash memory 17, thereby using the read data on the game program. The flash memory 17 may store not only the data transmitted and received between the game apparatus 3 and the external information processing apparatus, but also saved data (result data or intermediate step data of the game) of a game played with the game apparatus 3. Further, a game program may be stored in the flash memory 17.

Further, the game apparatus 3 is able to receive the operation data transmitted from the controller 5. Namely, the input/output processor 11a receives, via the antenna 23 and the controller communication module 19, the operation data transmitted from the controller 5, and (temporarily) stores the operation data in a buffer area of the internal main memory 11e or the external main memory 12.

Further, the game apparatus 3 is able to transmit to the terminal device 7 and receive from the terminal device 7 data of the image, the sound, and the like. When the game image (terminal game image) is transmitted to the terminal device 7, the input/output processor 11a outputs, to the codec LSI 27, data of the game image generated in the GPU 11b. The codec LSI 27 subjects, to a predetermined compression process, the image data outputted by the input/output processor 11a. The terminal communication module 28 wirelessly communicates with the terminal device 7. Therefore, the image data compressed by the codec LSI 27 is transmitted to the terminal device 7 via the antenna 29 by the terminal communication module 28. In the exemplary embodiment described herein, the image data transmitted from the game apparatus 3 to the terminal device 7 is used for a game. Therefore, if transmission of an image to be displayed in the game is delayed, operability in the game is adversely affected. Therefore, it is preferable that delay of the transmission of the image data from the game apparatus 3 to the terminal device 7 occurs as little as possible. Therefore, in the exemplary embodiment described herein, the codec LSI 27 compresses the image data by using a highly efficient compression technique in compliance with, for example, H.264 standard. It is to be noted that other compression techniques may be used, or uncompressed image data may be transmitted when a communication speed is sufficient. Further, the terminal communication module 28 is a communication module approved by, for example, Wi-Fi, and may perform wireless communication with the terminal device 7 at a high speed by using the MIMO (multiple input multiple output) techniques adopted in, for example, the IEEE 802.11n standard. Further, another communication mode may be used.

Further, the game apparatus 3 transmits, to the terminal device 7, the sound data as well as the image data. Namely, the input/output processor 11a outputs the sound data generated by the DSP 11c, through the codec LSI 27, to the terminal communication module 28. The codec LSI 27 subjects the sound data to a compression process, similarly to the image data. Although the compression mode for the sound data may be any mode, a mode in which the compression rate is high and deterioration of sound is reduced is preferably used. Further, in another exemplary embodiment, sound data, which is not subjected to the compression process, may be transmitted. The terminal communication module 28 transmits the compressed image data and the compressed sound data, via the antenna 29, to the terminal device 7.

Furthermore, the game apparatus 3 transmits, according to need, various control data as well as the image data and the sound data described above, to the terminal device 7. The control data represents control instructions for components included in the terminal device 7, and represents, for example, an instruction for controlling lighting of a marker section (a marker section 55 shown in FIG. 10), and an instruction for controlling imaging of a camera (a camera 56 shown in FIG. 10). The input/output processor 11a transmits the control data to the terminal device 7 according to an instruction from the CPU 10. Although the codec LSI 27 does not subject the control data to a compression process in the exemplary embodiment described herein, the compression process may be performed in another exemplary embodiment. The data transmitted from the game apparatus 3 to the terminal device 7 as described above may be encrypted according to need, or may not be encrypted.

Further, the game apparatus 3 is able to receive various data from the terminal device 7. In the exemplary embodiment described herein, the terminal device 7 transmits the operation data, the image data, and the sound data, which will be described below in detail. The data transmitted from the terminal device 7 is received by the terminal communication module 28 via the antenna 29. In the exemplary embodiment described herein, the image data and sound data transmitted from the terminal device 7 are subjected to the compression process which is similar to that for the image data and sound data transmitted from the game apparatus 3 to the terminal device 7. Therefore, the received image data and sound data are transferred from the terminal communication module 28 to the codec LSI 27, and the codec LSI 27 subjects the image data and sound data to a decompression process, and outputs, to the input/output processor 11a, the image data and sound data having been subjected to the decompression process. On the other hand, since the operation data transmitted from the terminal device 7 has an amount of data which is less than an amount of data of an image and a sound, the operation data may not be subjected to the compression process. Further, encryption may be performed according to need, or may not be performed. Therefore, the operation data is received by the terminal communication module 28, and is thereafter outputted via the codec LSI 27 to the input/output processor 11a. The input/output processor 11a (temporarily) stores the data received from the terminal device 7 in a buffer area of the internal main memory 11e or the external main memory 12.

Further, the game apparatus 3 is able to connect with another device and/or an external storage medium. Namely, to the input/output processor 11a, the extension connector 20 and the memory card connector 21 are connected. The extension connector 20 is a connector, such as a USB or an SCSI, for interface. The extension connector 20 can be connected to a medium such as an external storage medium or a peripheral device such as another controller, or allows communication with a network by connecting with a connector for wired communication instead of using the network communication module 18. The memory card connector 21 is a connector for connecting with an external storage medium such as a memory card. For example, the input/output processor 11a accesses the external storage medium via the extension connector 20 or the memory card connector 21, to store data in the external storage medium or read data from the external storage medium.

The game apparatus 3 has a power button 24, a reset button 25, and an ejection button 26. The power button 24 and the reset button 25 are connected to the system LSI 11. When the power button 24 is pressed so as to be ON, power is supplied to the respective components of the game apparatus 3 from an external power supply via an AC adapter which is not shown. When the reset button 25 is pressed, the system LSI 11 restarts a boot program for the game apparatus 3. The ejection button 26 is connected to the disk drive 14. When the ejection button 26 is pressed, the optical disc 4 is ejected from the disk drive 14.

In another exemplary embodiment, some of the components included in the game apparatus 3 may be implemented as an extension device which is separated from the game apparatus 3. In this case, for example, the extension device may be connected to the game apparatus 3 via the extension connector 20. Specifically, the extension device includes the components such as the codec LSI 27, the terminal communication module 28, and the antenna 29, and the extension device may be detachably connected to the extension connector 20. Thus, when the extension device is connected to a game apparatus which does not include the components described above, the game apparatus can be structured so as to be communicable with the terminal device 7.

3. Structure of Controller 5

Figure 3:
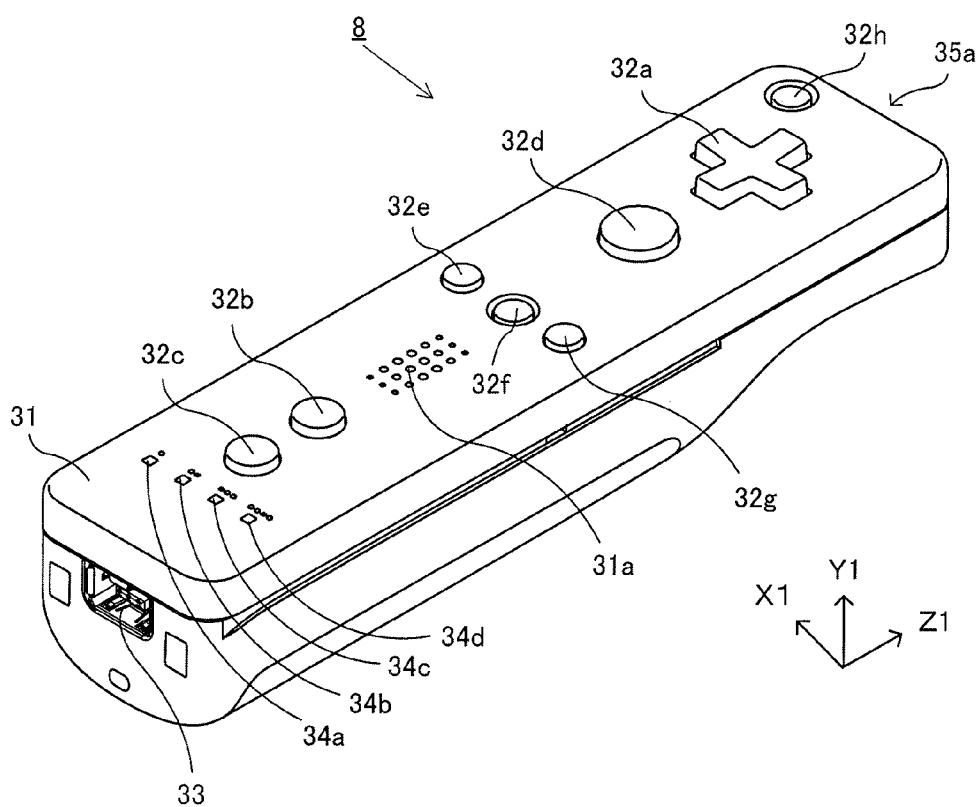
FIG. 3 is a perspective view showing a non-limiting exemplary external structure of a main controller 8.
Figure 4:
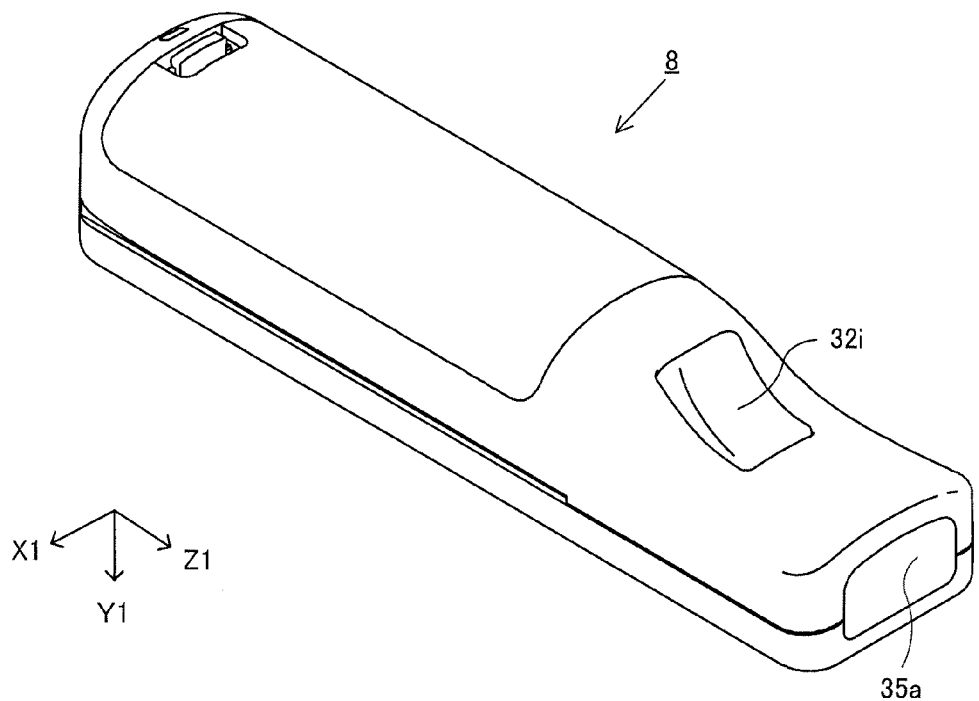
FIG. 4 is a perspective view showing a non-limiting exemplary external structure of the main controller 8.

Next, with reference to FIG. 3 to FIG. 7, the controller 5 will be described. As described above, the controller 5 includes the main controller 8 and the sub-controller 9. FIG. 3 and FIG. 4 are perspective views each showing a non-limiting exemplary external structure of the main controller 8. FIG. 3 is a perspective view showing a non-limiting example of the main controller 8 as viewed from the top rear side thereof. FIG. 4 is a perspective view showing a non-limiting example of the main controller 8 as viewed from the bottom front side thereof.

As shown in FIGS. 3 and 4, the main controller 8 includes a housing 31 formed by, for example, plastic molding. The housing 31 has a substantially parallelepiped shape extending in a longitudinal direction from front to rear (the Z1 axis direction shown in FIG. 3). The overall size of the housing 31 is small enough to be held by one hand of an adult or even a child. A user is allowed to perform a game operation by pressing buttons provided on the main controller 8 and moving the main controller 8 to change a position and an attitude (tilt) thereof.

The housing 31 include a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the specification described herein, the top surface of the housing 31 on which the buttons 32a to 32h are provided may be referred to as a "button surface. On the other hand, on a bottom surface of the housing 31, a recessed portion is formed, as shown in FIG. 4. On a slope surface on the rear side of the recessed portion, a B button 32i is provided. The operation buttons 32a to 32i are assigned functions in accordance with an information processing program executed by the game apparatus 3 according to need. Further, the power button 32h is used for remotely powering the game apparatus 3 body on or off. The home button 32f and the power button 32h each have a top surface thereof buried in the top surface of the housing 31. Thus, a user is prevented from inadvertently pressing the home button 32f or the power button 32h.

On the rear surface of the housing 31, a connector 33 is provided. The connector 33 is used for connecting another device (such as the sub-controller 9 or another sensor unit) to the main controller 8. Further, to the right and the left of the connector 33 on the rear surface of the housing 31, engagement holes 33a for preventing removal of the other device from being facilitated are provided.

On the rear side of the top surface of the housing 31, a plurality (four in FIG. 3) of LEDs 34a to 34d are provided. The controller 5 (the main controller 8) is assigned a controller type (number) so as to be distinguishable from the other controllers. For example, the LEDs 34a to 34d are used for informing a user of the controller type which is currently set to controller 5 that he or she is using, or of a remaining battery power of the controller 5. Specifically, when a game operation is performed by using the controller 5, one of the plurality of LEDs 34a to 34d is lit up according to the controller type.

Further, the main controller 8 includes an imaging information calculation section 35 (FIG. 6), and has, on the front surface of the housing 31, a light incident surface 35a of the imaging information calculation section 35, as shown in FIG. 4. The light incident surface 35a is formed of a material which allows at least infrared light from the markers 6R and 6L to pass therethrough.

A sound hole 31a for outputting sound to the outside from a speaker 47 (FIG. 5) included in the main controller 8 is formed between the first button 32b and the home button 32f on the top surface of the housing 31.

Figure 5:
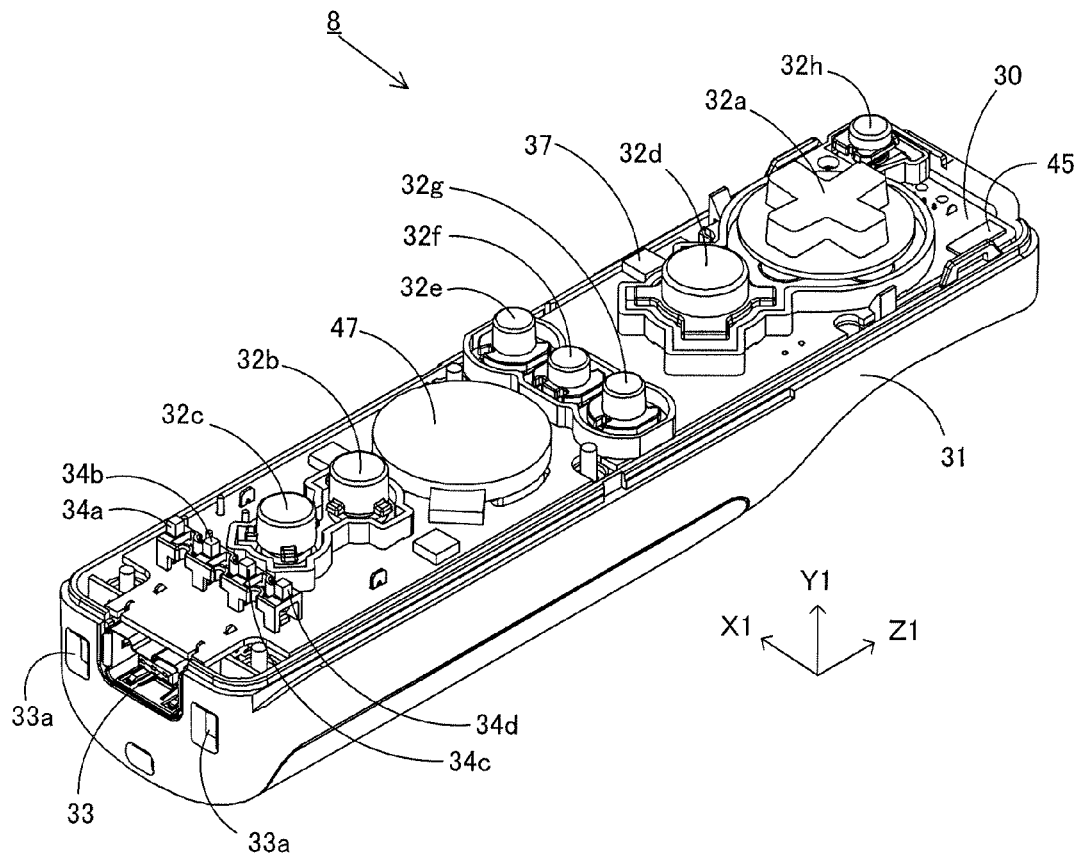
FIG. 5 shows a non-limiting exemplary internal structure of the main controller 8.
Figure 6:
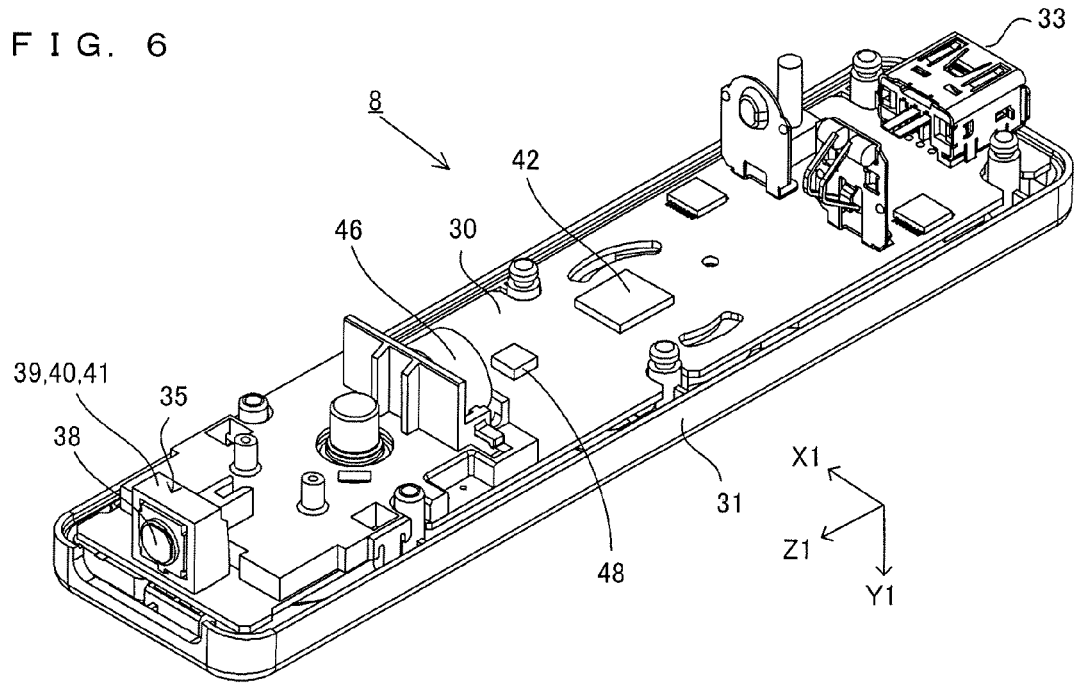
FIG. 6 shows a non-limiting exemplary internal structure of the main controller 8.

Next, with reference to FIGS. 5 and 6, an internal structure of the main controller 8 will be described. FIG. 5 and FIG. 6 show a non-limiting exemplary internal structure of the main controller 8. FIG. 5 is a perspective view showing a non-limiting exemplary state where an upper casing (a part of the housing 31) of the main controller 8 is removed. FIG. 6 is a perspective view showing a non-limiting exemplary state where a lower casing (a part of the housing 31) of the main controller 8 is removed. FIG. 6 is a perspective view showing a non-limiting exemplary reverse side of a substrate 30 shown in FIG. 5.

As shown in FIG. 5, the substrate 30 is fixed inside the housing 31. On a top main surface of the substrate 30, the operation buttons 32a to 32h, the LEDs 34a to 34d, an acceleration sensor 37, an antenna 45, the speaker 47, and the like are provided. These components are connected to a microcomputer 42 (see FIG. 6) via lines (not shown) formed on the substrate 30 and the like. In the exemplary embodiment described herein, the acceleration sensor 37 is positioned so as to be deviated from the center of the main controller 8 in the X1 axis direction. Thus, a movement of the main controller 8 is easily calculated when the main controller 8 is rotated about the Z1 axis. Further, the acceleration sensor 37 is positioned in front of the longitudinal (the Z1 axis direction) center of the main controller 8. Further, the wireless module 44 (FIG. 6) and the antenna 45 allow the controller 5 (the main controller 8) to act as a wireless controller.

On the other hand, as shown in FIG. 6, at the front edge of the bottom main surface of the substrate 30, the imaging information calculation section 35 is provided. The imaging information calculation section 35 includes an infrared filter 38, a lens 39, an image pickup element 40, and an image processing circuit 41 located in order, respectively, from the front of the main controller 8 on the bottom main surface of the substrate 30.

Further, on the bottom main surface of the substrate 30, the microcomputer 42 and the vibrator 46 are provided. The vibrator 46 is, for example, a vibration motor or a solenoid, and is connected to the microcomputer 42 via the lines formed on the substrate 30 and the like. The main controller 8 is vibrated by an actuation of the vibrator 46 according to an instruction from the microcomputer 42. Thus, the vibration is conveyed to a user's hand holding the main controller 8. Thus, a so-called vibration-feedback game is realized. In the exemplary embodiment described herein, the vibrator 46 is positioned slightly in front of the longitudinal center of the housing 31. Namely, the vibrator 46 is positioned near the end portion of the main controller 8 so as to be deviated from the longitudinal center thereof, and therefore a vibration of the entirety of the main controller 8 is enhanced by the vibration of the vibrator 46. Further, the connector 33 is mounted to the rear edge on the bottom main surface of the substrate 30. In addition to the components shown in FIG. 5 and FIG. 6, the main controller 8 includes a quartz oscillator for generating a reference clock for the microcomputer 42, an amplifier for outputting a sound signal to the speaker 47, and the like.

Figure 7:
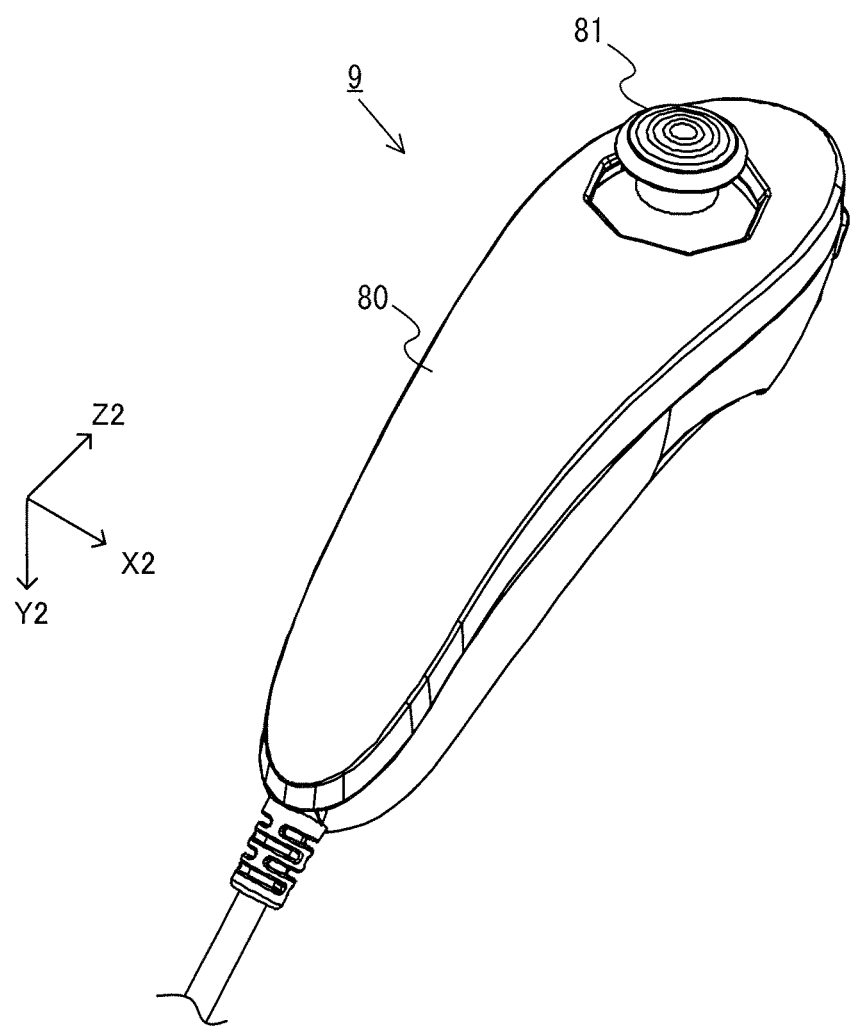
FIG. 7 is a perspective view showing a non-limiting exemplary external structure of a sub-controller 9.

FIG. 7 is a perspective view showing a non-limiting exemplary external structure of the sub-controller 9. The sub-controller 9 includes a housing 80 formed by, for example, plastic molding. The overall size of the housing 80 is small enough to be held by one hand of an adult or even a child, similarly to the main controller 8. A player is allowed to perform a game operation also with the sub-controller 9 by operating buttons and a stick, and changing a position and an attitude of the controller itself.

As shown in FIG. 7, an analog joystick 81 is provided on the front edge side (on the Z2-axis positive direction side) of the top surface (on the Y2-axis negative direction side) of the housing 80. Further, a front edge surface is formed on the front edge of the housing 80 so as to be slightly sloped backward, which is not shown. On the front edge surface, a C button and a Z button are provided so as to be aligned in the upward/downward direction (in the Y2-axis direction shown in FIG. 7). The analog joystick 81 and the respective buttons (the C button and the Z button) are assigned functions in accordance with a game program executed by the game apparatus 3 according to need. The analog joystick 81 and the respective buttons may be collectively referred to as an "operation section 82 (see FIG. 8)".

The sub-controller 9 includes an acceleration sensor (an acceleration sensor 83 shown in FIG. 8) inside the housing 80, although it is not shown in FIG. 7. In the exemplary embodiment described herein, the acceleration sensor 83 is implemented as the same acceleration sensor as the acceleration sensor 37 of the main controller 8. However, the acceleration sensor 83 may not be implemented as the same acceleration sensor as the acceleration sensor 37. For example, the acceleration sensor 83 may be an acceleration sensor operable to detect an acceleration for a predetermined one axis or predetermined two axes.

Further, as shown in FIG. 7, one end of a cable is connected to the rear end of the housing 80. The other end of the cable is connected to a connector (a connector 84 shown in FIG. 8), although it is not shown in FIG. 7. The connector is able to connect with the connector 33 of the main controller 8. Namely, the main controller 8 and the sub-controller 9 are connected to each other by connecting between the connector 33 and the connector 84.

It is to be noted that the shape of each of the main controller 8 and the sub-controller 9, the shapes of the operation buttons, the number of the acceleration sensors and the number of the vibrators, the setting positions of the acceleration sensors and the vibrators, and the like, which are as described above with reference to FIG. 3 to FIG. 7, are merely examples. The other shapes, numbers, and setting positions may be used. Further, in the exemplary embodiment described herein, an imaging direction of the imaging means of the main controller 8 is the Z1 axis positive direction. However, the imaging direction may be any direction. Namely, the position (the light incident surface 35a of the imaging information calculation section 35) of the imaging information calculation section 35 of the controller 5 may not be the front surface of the housing 31. The imaging information calculation section 35 may be provided on any other surface on which light from the outside of the housing 31 can be incident.

Figure 8:
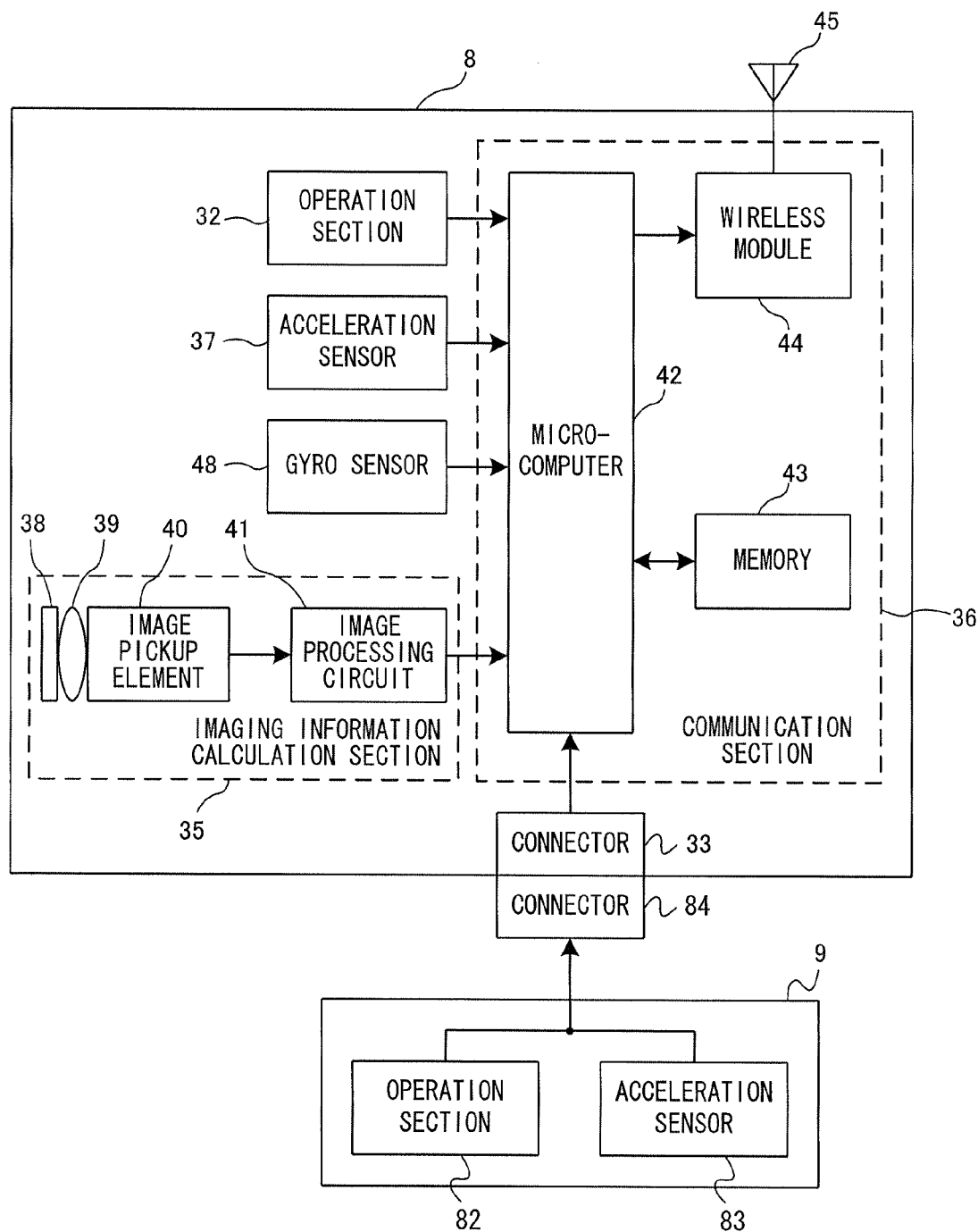
FIG. 8 is a block diagram showing a non-limiting exemplary structure of a controller 5.

FIG. 8 is a block diagram showing a non-limiting exemplary structure of the controller 5. As shown in FIG. 8, the main controller 8 includes the operation section 32 (the operation buttons 32a to 32i), the imaging information calculation section 35, a communication section 36, the acceleration sensor 37, and the gyro sensor 48. Further, the sub-controller 9 includes the operation section 82 and the acceleration sensor 83. The controller 5 transmits data representing contents of an operation performed on the controller 5, as operation data, to the game apparatus 3. In the following description, the operation data transmitted by the controller 5 may be referred to as "controller operation data", and the operation data transmitted by the terminal device 7 may be referred to as "terminal operation data."

The operation section 32 includes the operation buttons 32a to 32i described above, and outputs, to the microcomputer 42 of the communication section 36, operation button data representing an input state (whether or not each of the operation buttons 32a to 32i has been pressed) of each of the operation buttons 32a to 32i.

The imaging information calculation section 35 is a system for analyzing data of an image taken by the imaging means, identifying an area thereof having a high brightness, and calculating the position of the center of gravity, the size, and the like of the area. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the image pickup element 40, and the image processing circuit 41. The infrared filter 38 allows only infrared light to pass therethrough, among light incident on the front surface of the controller 5. The lens 39 collects the infrared light which has passed through the infrared filter 38, and outputs the infrared light to the image pickup element 40. The image pickup element 40 is a solid-state image pick-up device such as, for example, a CMOS sensor or a CCD sensor. The image pickup element 40 receives the infrared light collected by the lens 39, and outputs an image signal. The marker section 55 of the terminal device 7 and the marker device 6, which are imaging subjects the images of which are taken, are formed of markers for outputting infrared light. Accordingly, when the infrared filter 38 is provided, the image pickup element 40 receives only the infrared light which has passed through the infrared filter 38, and generates image data, so that images of the imaging subjects (the marker section 55 and/or the maker device 6) can be accurately taken. Hereinafter, the image taken by the image pickup element 40 is referred to as a taken image. The image data generated by the image pickup element 40 is processed by the image processing circuit 41. The image processing circuit 41 calculates a position of the imaging subject in the taken image. The image processing circuit 41 outputs data of a coordinate representing the calculated position, to the microcomputer 42 of the communication section 36. The data representing the coordinate is transmitted as the operation data to the game apparatus 3 by the microcomputer 42. Hereinafter, the coordinate is referred to as a "marker coordinate". The marker coordinate represents various values so as to correspond to an attitude (tilt angle) and/or a position of the controller 5. Therefore, the game apparatus 3 is able to calculate the attitude and/or the position of the controller 5 by using the marker coordinate.

In another exemplary embodiment, the controller 5 may not include the image processing circuit 41. The taken image itself may be transmitted from the controller 5 to the game apparatus 3. In this case, the game apparatus 3 includes a circuit or a program having a function equivalent to the function of the image processing circuit 41, thereby calculating the marker coordinate.

The acceleration sensor 37 detects an acceleration (including the gravitational acceleration) of the controller 5, that is, a force (including the gravitational force) applied to the controller 5. The acceleration sensor 37 detects a value of an acceleration (linear acceleration) in the straight line direction along the sensing axis direction, among accelerations applied to a detection section of the acceleration sensor 37. For example, a multi-axes acceleration sensor having two or more axes detects accelerations of components along the axes, respectively, as an acceleration applied to the detection section of the acceleration sensor. It is to be noted that the acceleration sensor 37 is an electrostatic capacitance type MEMS (micro electro mechanical system) acceleration sensor. However, another type of acceleration sensor may be used.

In the exemplary embodiment described herein, the acceleration sensor 37 detects linear accelerations in three axial directions, that is, the up/down direction (the Y1 axis direction shown in FIG. 3) of the controller 5, the left/right direction (the X1 axis direction shown in FIG. 3) of the controller 5, and the forward/backward direction (the Z1 axis direction shown in FIG. 3) of the controller 5. The acceleration sensor 37 detects an acceleration in the straight line direction along each axis. Therefore, an output of the acceleration sensor 37 represents a value of the linear acceleration for each of the three axes. Namely, the detected acceleration is represented as a three-dimensional vector in an X1Y1Z1 coordinate system (a controller coordinate system) defined relative to the controller 5.

Data (acceleration data) representing an acceleration detected by the acceleration sensor 37 is outputted to the communication section 36. The acceleration detected by the acceleration sensor 37 is changed so as to correspond to an attitude (tilt angle) and a movement of the controller 5. Therefore, an attitude and a movement of the controller 5 can be calculated by using the acceleration data obtained by the game apparatus 3. In the exemplary embodiment described herein, the game apparatus 3 calculates an attitude, a tilt angle, and the like of the controller 5 based on the obtained acceleration data.

When a computer such as a processor (for example, the CPU 10) of the game apparatus 3 or a processor (for example, the microcomputer 42) of the controller 5 performs processing based on a signal of an acceleration outputted from the acceleration sensor 37 (and an acceleration sensor 63 described below), additional information relating to the controller 5 can be inferred or calculated (determined), as one skilled in the art will readily understand from the description herein. For example, a case where it is anticipated that the computer will perform processing on the assumption that the controller 5 having the acceleration sensor 37 mounted thereto is in a static state (that is, a case where it is anticipated that the computer will perform processing on the assumption that an acceleration detected by the acceleration sensor will include only the gravitational acceleration) will be described. When the controller 5 is actually in the static state, it is possible to determine whether or not the controller 5 tilts relative to the gravity direction and to also determine a degree of the tilt, based on the acceleration having been detected. Specifically, when a state where 1G (gravitational acceleration) is applied to a detection axis of the acceleration sensor 37 in the vertically downward direction represents a reference, it is possible to determine whether or not the controller 5 tilts relative to the reference, based on whether 1G (gravitational acceleration) is applied, and to determine a degree of tilt of the controller 5 relative to the reference, based on the magnitude of the detected acceleration. Further, in the case of the multi-axes acceleration sensor 37, when a signal of an acceleration of each axis is further subjected to processing, a degree to the tilt of the controller 5 relative to the gravity direction can be determined with enhanced accuracy. In this case, the processor may calculate a tilt angle of the controller 5 based on an output from the acceleration sensor 37, or may calculate a direction in which the controller 5 tilts without calculating the tilt angle. Thus, when the acceleration sensor 37 is used in combination with the processor, a tilt angle or an attitude of the controller 5 can be determined.

On the other hand, in a case where it is anticipated that the controller 5 will be in a dynamic state (a state in which the controller 5 is being moved), the acceleration sensor 37 detects an acceleration based on a movement of the controller 5, in addition to the gravitational acceleration. Therefore, when the gravitational acceleration component is eliminated from the detected acceleration through a predetermined process, it is possible to determine a direction in which the controller 5 moves. Further, when it is anticipated that the controller 5 will be in the dynamic state, an acceleration component based on the movement of the acceleration sensor is eliminated from the detected acceleration through a predetermined process, whereby it is possible to determine the tilt of the controller 5 relative to the gravity direction. In another exemplary embodiment, the acceleration sensor 37 may include an embedded processor or another type of dedicated processor for performing a predetermined process of the acceleration signal detected by embedded acceleration detection means before the acceleration signal is outputted to the microcomputer 42. When, for example, the acceleration sensor 37 is used for detecting a static acceleration (for example, gravitational acceleration), the embedded or dedicated processor could convert the acceleration signal to a tilt angle (or another preferable parameter).

The gyro sensor 48 detects angular velocities around three axes (in the exemplary embodiment described herein, the X1, Y1, and Z1 axes). In the description herein, a direction of rotation around the X1 axis is referred to as a pitch direction, a direction of rotation around the Y1 axis is referred to as a yaw direction, and a direction of rotation around the Z1 axis is referred to as a roll direction. The gyro sensor 48 may detect angular velocities around the three axes, and the number of the gyro sensors to be used, and a manner in which the gyro sensors to be used are combined may be determined as desired. For example, the gyro sensor 48 may be a three-axes gyro sensor, or may be a gyro sensor obtained by combining a two-axes gyro sensor and a one axis gyro sensor with each other so as to detect angular velocities around the three axes. Data representing the angular velocity detected by the gyro sensor 48 is outputted to the communication section 36. Further, the gyro sensor 48 may detect an angular velocity around one axis or two axes.

Further, the operation section 82 of the sub-controller 9 includes the analog joystick 81, the C button, and the Z button as described above. The operation section 82 outputs stick data (referred to as sub-stick data) representing a direction in which the analog joystick 81 is tilted and an amount of the tilt of the analog joystick 81, and operation button data (referred to as sub-operation button data) representing an input state (whether or not each button is pressed) of each button, via the connector 84, to the main controller 8.

Further, the acceleration sensor 83 of the sub-controller 9, which is similar to the acceleration sensor 37 of the main controller 8, detects an acceleration (including the gravitational acceleration) of the sub-controller 9, that is, a force (including the gravitational force) applied to the sub-controller 9. The acceleration sensor 83 detects values of accelerations (linear accelerations) in the straight line directions along predetermined three-axial directions, among accelerations applied to a detection section of the acceleration sensor 83. Data (referred to as sub-acceleration data) representing the detected acceleration is outputted via the connector 84 to the main controller 8.

As described above, the sub-controller 9 outputs, to the main controller 8, sub-controller data including the sub-stick data, the sub-operation button data, and the sub-acceleration data described above.

The communication section 36 of the main controller 8 includes the microcomputer 42, a memory 43, a wireless module 44, and the antenna 45. The microcomputer 42 controls the wireless module 44 for wirelessly transmitting data obtained by the microcomputer 42 to the game apparatus 3, while using the memory 43 as a storage area in order to perform processing.

The sub-controller data transmitted from the sub-controller 9 is inputted to the microcomputer 42, and temporarily stored in the memory 43. Further, data (referred to as main controller data) outputted to the microcomputer 42 from the operation section 32, the imaging information calculation section 35, the acceleration sensor 37, and the gyro sensor 48 is temporarily stored in the memory 43. The main controller data and the sub-controller data are transmitted as the operation data (controller operation data) to the game apparatus 3. Specifically, the microcomputer 42 outputs, to the wireless module 44, the operation data stored in the memory 43 at a time at which the data is to be transmitted to the controller communication module 19 of the game apparatus 3. The wireless module 44 uses, for example, the Bluetooth (registered trademark) technology to modulate the operation data onto a carrier wave of a predetermined frequency, and emits the low power radio wave signal from the antenna 45. Namely, the operation data is modulated into the low power radio wave signal by the wireless module 44, and transmitted from the controller 5. The low power radio wave signal is received by the controller communication module 19 on the game apparatus 3 side. The game apparatus 3 demodulates or decodes the received low power radio wave signal to obtain the operation data. The CPU 10 of the game apparatus 3 uses the operation data received from the controller 5 to perform a game process. The wireless transmission from the communication section 36 to the controller communication module 19 is sequentially performed at predetermined time intervals. Since the game process is generally performed at a cycle of $\frac{1}{60}$ sec. (as one frame time), data preferably needs to be transmitted at a cycle of $\frac{1}{60}$ sec. or a shorter cycle. For example, the communication section 36 of the controller 5 outputs the operation data to the controller communication module 19 of the game apparatus 3 every $\frac{1}{200}$ seconds.

As described above, the main controller 8 is able to transmit the marker coordinate data, the acceleration data, the angular velocity data, and the operation button data as the operation data representing an operation performed on the main controller 8. The sub-controller 9 is able to transmit the acceleration data, the sub-stick data, and the operation button data as the operation data representing an operation performed on the sub-controller 9. Further, the game apparatus 3 executes the game process by using the operation data as a game input. Therefore, by using the controller 5, a user is allowed to perform a game operation of moving the controller 5 itself in addition to a conventional game operation of pressing each operation button. For example, a user is allowed to perform, for example, operations of tilting the main controller 8 and/or the sub-controller 9 at desired attitudes, an operation of indicating a desired position on the screen by using the main controller 8, and operations of moving the main controller 8 and/or the sub-controller 9.

Further, although, in the exemplary embodiment described herein, the controller 5 does not have display means for displaying a game image, the controller 5 may have display means for displaying, for example, an image indicative of a remaining battery power.

4. Structure of Terminal Device 7

Figure 9:
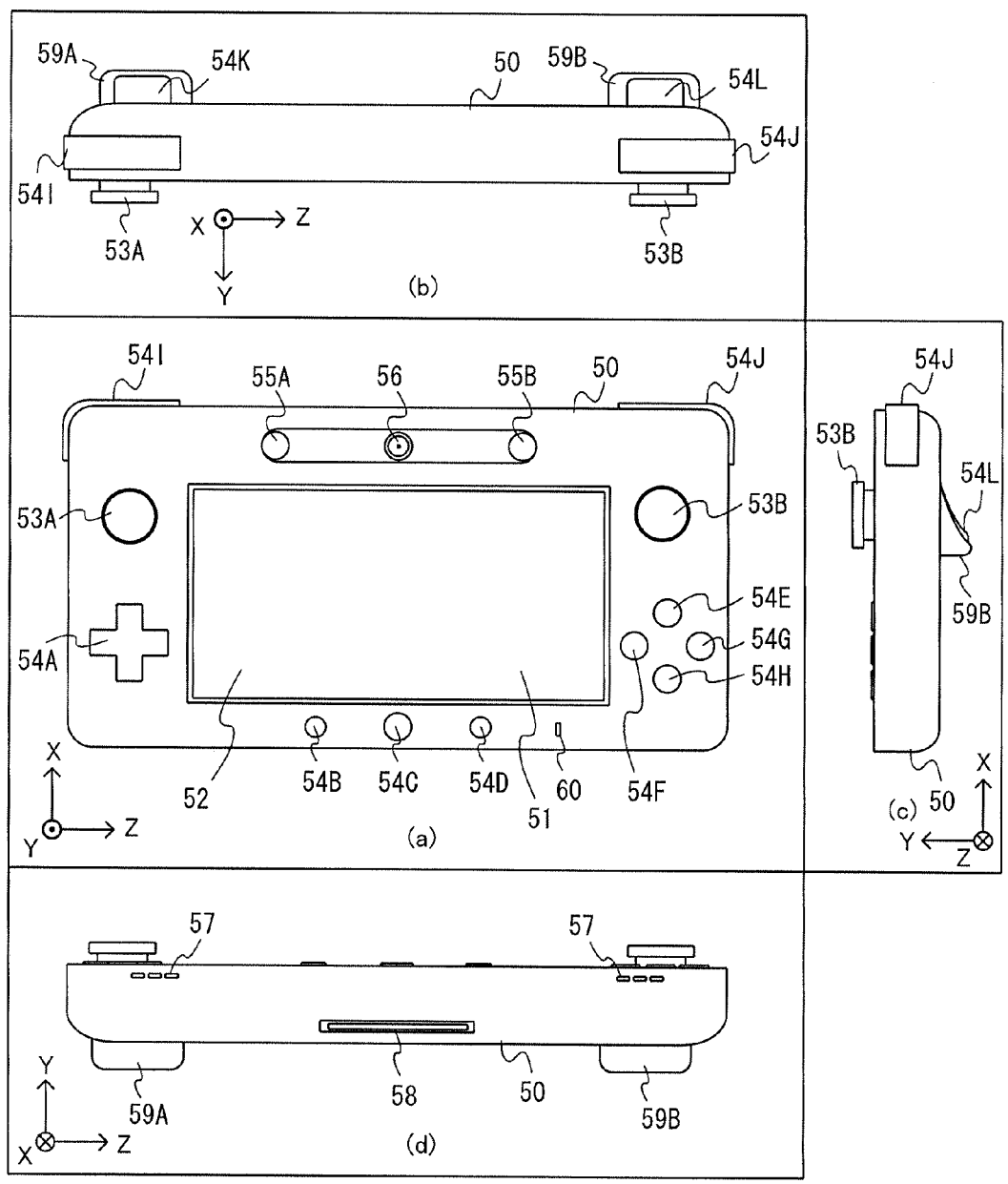
FIG. 9 shows a non-limiting exemplary external structure of a terminal device 7.
Figure 11:
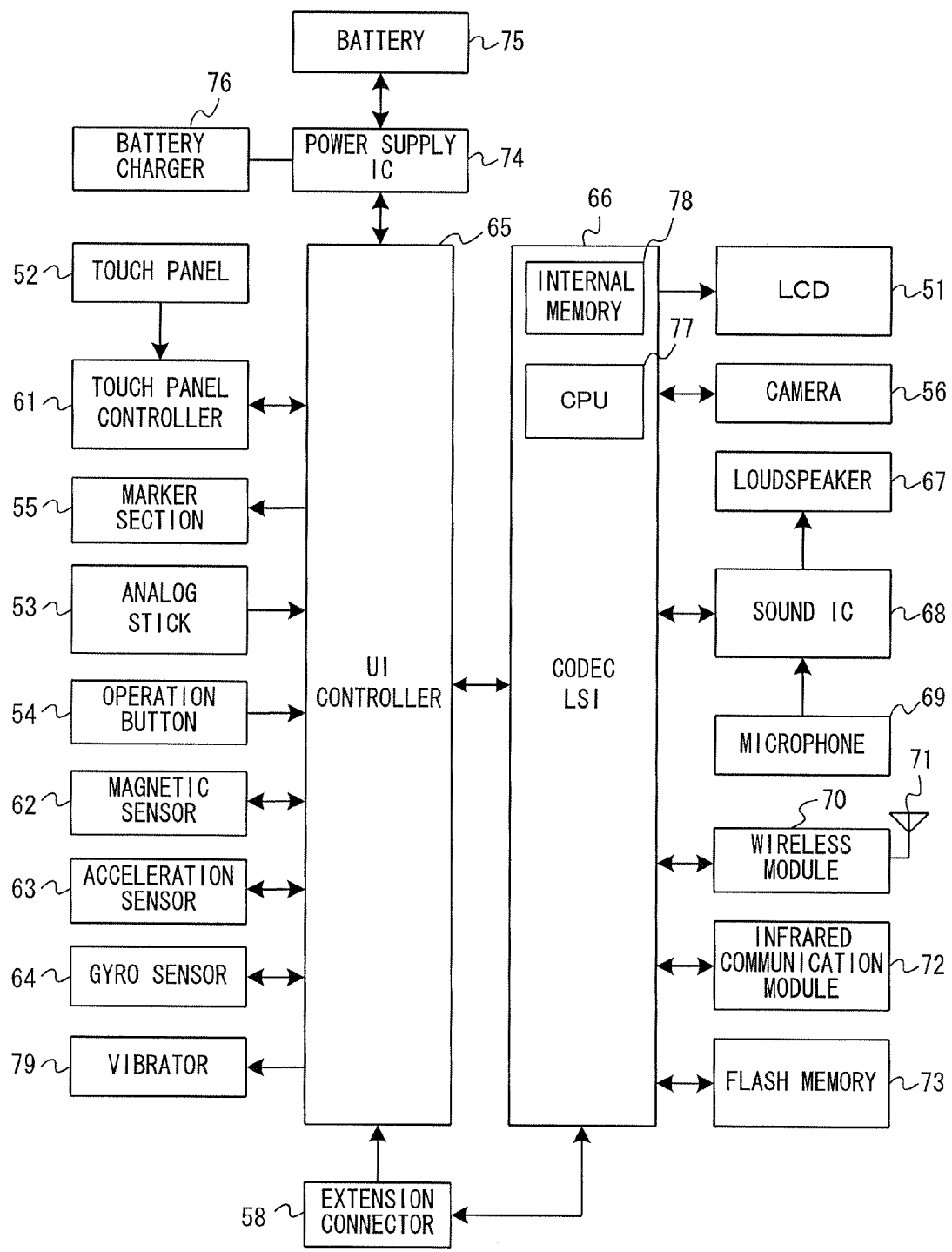
FIG. 11 is a block diagram showing a non-limiting exemplary internal structure of the terminal device 7.

Next, a structure of the terminal device 7 will be described with reference to FIGS. 9 to 11. FIG. 9 shows a non-limiting exemplary external structure of the terminal device 7. (a) of FIG. 9 is a front view showing a non-limiting example of the terminal device 7, (b) of FIG. 9 is a top view thereof, (c) of FIG. 9 is a right side view thereof, and (d) of FIG. 9 is a bottom view thereof. FIG. 10 shows a non-limiting exemplary state in which a user holds the terminal device 7.

As shown in FIG. 9, the terminal device 7 includes a housing 50 which approximately has a horizontally long plate-like rectangular shape. The housing 50 is small enough to be held by a user. Therefore, the user is allowed to hold and move the terminal device 7, and change the location of the terminal device 7.

The terminal device 7 includes an LCD 51 on a front surface of the housing 50. The LCD 51 is provided near the center of the front surface of the housing 50. Therefore, as shown in FIG. 10, by holding the housing 50 at portions to the right and the left of the LCD 51, a user is allowed to hold and move the terminal device while viewing a screen of the LCD 51. FIG. 10 shows an exemplary case in which a user holds the terminal device 7 horizontally (with the longer sides of the terminal device 7 being oriented horizontally) by holding the housing 50 at portions to the right and the left of the LCD 51. However, the user may hold the terminal device 7 vertically (with the longer sides of the terminal device 7 being oriented vertically).

As shown in (a) of FIG. 9, the terminal device 7 includes, as operation means, a touch panel 52 on the screen of the LCD 51. In the exemplary embodiment described herein, the touch panel 52 is, but is not limited to, a resistive film type touch panel. However, a touch panel of any type, such as electrostatic capacitance type touch panel, may be used. The touch panel 52 may be of single touch type or multiple touch type. In the exemplary embodiment described herein, the touch panel 52 has the same resolution (detection accuracy) as that of the LCD 51. However, the resolution of the touch panel 52 and the resolution of the LCD 51 need not be the same. Although an input onto the touch panel 52 is usually performed by using a touch pen, a finger of a user, in addition to the touch pen, may be used for performing an input onto the touch panel 52. The housing 50 may have an opening for accommodating the touch pen used for performing an operation on the touch panel 52. Thus, since the terminal device 7 has the touch panel 52, a user is allowed to operate the touch panel 52 while moving the terminal device 7. That is, the user is allowed to directly (by using the touch panel 52) perform an input onto the screen of the LCD 51 while moving the screen of the LCD 51.

As shown in FIG. 9, the terminal device 7 has, as operation means, two analog sticks 53A and 53B, and a plurality of buttons 54A to 54L. The analog sticks 53A and 53B are each a device for designating a direction. The analog sticks 53A and 53B are each configured such that a stick part operated by a finger of the user is slidable (or tiltable) in any direction (at any angle in any direction such as the upward, the downward, the rightward, the leftward, or the diagonal direction) relative to the front surface of the housing 50. The left analog stick 53A is provided to the left of the screen of the LCD 51, and the right analog stick 53B is provided to the right of the screen of the LCD 51. Therefore, the user is allowed to perform an input for designating a direction by using the analog stick with either the left hand or the right hand. Further, as shown in FIG. 10, the analog sticks 53A and 53B are positioned so as to be operated by the user holding the right and left portions of the terminal device 7. Therefore, the user is allowed to easily operate the analog sticks 53A and 53B also when the user holds and moves the terminal device 7.

The buttons 54A to 54L are each operation means for performing a predetermined input. As described below, the buttons 54A to 54L are positioned so as to be operated by the user holding the right and left portions of the terminal device 7 (see FIG. 10). Accordingly, the user is allowed to easily operate the operation means when the user holds and moves the terminal device 7.

As shown in (a) of FIG. 9, among the operation buttons 54A to 54L, the cross button (direction input button) 54A and the buttons 54B to 54H are provided on the front surface of the housing 50. Namely, the buttons 54A to 54H are positioned so as to be operated by a thumb of the user (see FIG. 10).

The cross button 54A is provided to the left of the LCD 51 below the left analog stick 53A. That is, the cross button 54A is positioned so as to be operated by the left hand of the user. The cross button 54A is cross-shaped, and is capable of designating an upward, a downward, a leftward, or a rightward direction. The buttons 54B to 54D are provided below the LCD 51. The three buttons 54B to 54D are positioned so as to be operated by the right and left hands of the user. The four buttons 54E to 54H are provided to the right of the LCD 51 below the right analog stick 53B. Namely the four buttons 54E to 54H are positioned so as to be operated by the right hand of the user. Further, the four buttons 54E, 54H, 54F, and 54G are positioned upward, downward, leftward, and rightward, respectively, (with respect to a center position of the four buttons). Accordingly, the terminal device 7 may cause the four buttons 54E to 54H to function as buttons which allow the user to designate an upward, a downward, a leftward, or a rightward direction.

As shown in (a), (b), and (c) of FIG. 9, a first L button 54I and a first R button 54J are provided on diagonally upper portions (an upper left portion and an upper right portion) of the housing 50. Specifically, the first L button 54I is provided on the left end of the upper side surface of the plate-shaped housing 50 so as to protrude from the upper and left side surfaces. The first R button 54J is provided on the right end of the upper side surface of the housing 50 so as to protrude from the upper and right side surfaces. In this way, the first L button 54I is positioned so as to be operated by the index finger of the left hand of the user, and the first R button 54J is positioned so as to be operated by the index finger of the right hand of the user (see FIG. 10).

As shown in (b) and (c) of FIG. 9, leg parts 59A and 59B are provided so as to protrude from a rear surface (i.e., a surface reverse of the front surface on which the LCD 51 is provided) of the plate-shaped housing 50, and a second L button 54K and a second R button 54L are provided on the leg parts 59A and 59B, respectively. Specifically, the second L button 54K is provided at a slightly upper position on the left side (the left side as viewed from the front surface side) of the rear surface of the housing 50, and the second R button 54L is provided at a slightly upper position on the right side (the right side as viewed from the front surface side) of the rear surface of the housing 50. In other words, the second L button 54K is provided at a position substantially opposite to the position of the left analog stick 53A provided on the front surface, and the second R button 54L is provided at a position substantially opposite to the position of the right analog stick 53B provided on the front surface. Thus, the second L button 54K is positioned so as to be operated by the middle finger of the left hand of the user, and the second R button 54L is positioned so as to be operated by the middle finger of the right hand of the user (see FIG. 10). Further, as shown in (c) of FIG. 9, the leg parts 59A and 59B each have a surface facing diagonally upward, and the second L button 54K and the second R button 54L are provided on the diagonally upward facing surfaces of the leg parts 59A and 59B, respectively. Thus, the second L button 54K and the second R button 54L each have a button surface facing diagonally upward. Since it is supposed that the middle fingers of the user move vertically when the user holds the terminal device 7, the upward facing button surfaces allow the user to easily press the second L button 54K and the second R button 54L. Further, the leg parts provided on the rear surface of the housing 50 allow the user to easily hold the housing 50. Moreover, the buttons provided on the leg parts allow the user to easily perform operation while holding the housing 50.

In the terminal device 7 shown in FIG. 9, the second L button 54K and the second R button 54L are provided on the rear surface of the housing 50. Therefore, if the terminal device 7 is placed with the screen of the LCD 51 (the front surface of the housing 50) facing upward, the screen of the LCD 51 may not be perfectly horizontal. Accordingly, in another exemplary embodiment, three or more leg parts may be provided on the rear surface of the housing 50. In this case, if the terminal device 7 is placed on a floor with the screen of the LCD 51 facing upward, the three or more leg parts contact with the floor (or another horizontal surface). Thus, the terminal device 7 can be placed with the screen of the LCD 51 being horizontal. Such a horizontal placement of the terminal device 7 may be achieved by additionally providing detachable leg parts.

The respective buttons 54A to 54L are assigned functions, according to need, in accordance with a game program. For example, the cross button 54A and the buttons 54E to 54H may be used for direction designation operation, selection operation, and the like, and the buttons 54B to 54D may be used for determination operation, cancellation operation, and the like.

The terminal device 7 includes a power button (not shown) for turning on/off the power of the terminal device 7. The terminal device 7 may include a button for turning on/off screen display of the LCD 51, a button for performing connection setting (pairing) for connecting with the game apparatus 3, and a button for adjusting a sound volume of loudspeakers (loudspeakers 67 shown in FIG. 11).

As shown in (a) of FIG. 9, the terminal device 7 includes a marker section (a marker section 55 shown in FIG. 11) having a marker 55A and a marker 55B, on the front surface of the housing 50. The marker section 55 may be provided at any position. In the exemplary embodiment described herein, the marker section 55 is provided above the LCD 51. The markers 55A and 55B are each implemented as one or more infrared LEDs, like the markers 6L and 6R of the marker device 6. The marker section 55 is used, like the marker device 6, for causing the game apparatus 3 to calculate, for example, a movement of the controller 5 (the main controller 8). The game apparatus 3 is capable of controlling the infrared LEDs of the marker section 55 to be on or off.

The terminal device 7 includes a camera 56 as imaging means. The camera 56 includes an image pickup element (e.g., a CCD image sensor or a CMOS image sensor) having a predetermined resolution, and a lens. As shown in FIG. 9, in the exemplary embodiment describe herein, the camera 56 is provided on the front surface of the housing 50. Accordingly, the camera 56 is capable of taking an image of the face of the user holding the terminal device 7. For example, the camera 56 is capable of taking an image of the user playing a game while viewing the LCD 51. In another exemplary embodiment, one or more camera may be included in the terminal device 7.

The terminal device 7 has a microphone (a microphone 69 shown in FIG. 11) as sound input means. A microphone hole 60 is provided in the front surface of the housing 50. The microphone 69 is embedded in the housing 50 at a position inside the microphone hole 60. The microphone detects for sound, such as user's voice, around the terminal device 7. In another exemplary embodiment, one or more microphone may be included in the terminal device 7.

The terminal device 7 has loudspeakers (loudspeakers 67 shown in FIG. 11) as sound output means. As shown in (d) of FIG. 9, loudspeaker holes 57 are provided in the lower side surface of the housing 50. Sound is outputted through the speaker holes 57 from the loudspeakers 67. In the exemplary embodiment described herein, the terminal device 7 has two loudspeakers, and the speaker holes 57 are provided at positions corresponding to a left loudspeaker and a right loudspeaker, respectively. The number of loudspeakers included in the terminal device 7 may be any number, and additional loudspeakers, in addition to the two loudspeakers, may be provided in the terminal device 7.

The terminal device 7 includes an extension connector 58 for connecting another device to the terminal device 7. In the exemplary embodiment described herein, as shown in (d) of FIG. 9, the extension connector 58 is provided in the lower side surface of the housing 50. Any device may be connected to the extension connector 58. For example, a controller (a gun-shaped controller or the like) used for a specific game or an input device such as a keyboard may be connected to the extension connector 58. If another device need not be connected, the extension connector 58 need not be provided.

In the terminal device 7 shown in FIG. 9, the shapes of the operation buttons and the housing 50, the number of the respective components, and the positions in which the components are provided, are merely examples. The shapes, numbers, and positions may be different from those described above.

Next, an internal structure of the terminal device 7 will be described with reference to FIG. 11. FIG. 11 is a block diagram showing a non-limiting exemplary internal structure of the terminal device 7. As shown in FIG. 11, the terminal device 7 includes, in addition to the components shown in FIG. 9, a touch panel controller 61, a magnetic sensor 62, the acceleration sensor 63, the gyro sensor 64, a user interface controller (UI controller) 65, a codec LSI 66, the loudspeakers 67, a sound IC 68, the microphone 69, a wireless module 70, an antenna 71, an infrared communication module 72, a flash memory 73, a power supply IC 74, a battery 75, and a vibrator 79. These electronic components are mounted on an electronic circuit board and accommodated in the housing 50.

The UI controller 65 is a circuit for controlling data input to various input sections and data output from various output sections. The UI controller 65 is connected to the touch panel controller 61, the analog stick 53 (the analog sticks 53A and 53B), the operation button 54 (the operation buttons 54A to 54L), the marker section 55, the magnetic sensor 62, the acceleration sensor 63, the gyro sensor 64, and the vibrator 79. Further, the UI controller 65 is connected to the codec LSI 66 and the extension connector 58. The power supply IC 74 is connected to the UI controller 65, so that power is supplied to the respective components through the UI controller 65. The internal battery 75 is connected to the power supply IC 74, so that power is supplied from the internal battery 75. Further, a battery charger 76 or a cable, which is supplied with power from an external power supply, may be connected to the power supply IC 74 via a connector or the like. In this case, the terminal device 7 can be supplied with power and charged from the external power supply by using the battery charger 76 or the cable. Charging of the terminal device 7 may be performed by setting the terminal device 7 on a cradle (not shown) having a charging function.

The touch panel controller 61 is a circuit which is connected to the touch panel 52, and controls the touch panel 52. The touch panel controller 61 generates a predetermined form of touch position data, based on a signal from the touch panel 52, and outputs the touch position data to the UI controller 65. The touch position data represents a coordinate of a position (the position may be a plurality of positions when the touch panel 52 is a multiple touch type one) at which an input is performed on an input surface of the touch panel 52. The touch panel controller 61 reads a signal from the touch panel 52 and generates the touch position data every predetermined period of time. Further, various control instructions for the touch panel 52 are output from the UI controller 65 to the touch panel controller 61.

The analog stick 53 outputs, to the UI controller 65, stick data representing a direction in which the stick part operated by a finger of the user slides (or tilts), and an amount of the sliding (tilting). The operation button 54 outputs, to the UI controller 65, operation button data representing an input state of each of the operation buttons 54A to 54L (whether or not each of the operation buttons is pressed).

The magnetic sensor 62 detects the magnitude and direction of a magnetic field to detect an orientation. Orientation data representing the detected orientation is outputted to the UI controller 65. The UI controller 65 outputs, to the magnetic sensor 62, a control instruction for the magnetic sensor 62. Examples of the magnetic sensor 62 include: sensors using, for example, an MI (Magnetic Impedance) device, a fluxgate sensor, a hall device, a GMR (Giant Magneto Resistance) device, a TMR (Tunneling Magneto Resistance) device, and an AMR (Anisotropic Magneto Resistance) device. However, any sensor may be adopted as long as the sensor can detect an orientation. Strictly speaking, the obtained orientation data does not represent an orientation in a place where a magnetic field in addition to the geomagnetism is generated. Even in such a case, it is possible to calculate a change in the attitude of the terminal device 7 because the orientation data changes when the terminal device 7 moves.

The acceleration sensor 63 is provided inside the housing 50. The acceleration sensor 63 detects the magnitudes of linear accelerations along three axial directions (XYZ axial directions shown in (a) of FIG. 9), respectively. Specifically, the long side direction of the housing 50 is defined as the Z-axial direction, the short side direction of the housing 50 is defined as the X-axial direction, and the direction orthogonal to the front surface of the housing 50 is defined as the Y-axial direction, and the acceleration sensor 63 detects the magnitudes of the linear accelerations in the respective axial directions. Acceleration data representing the detected accelerations is outputted to the UI controller 65. The UI controller 65 outputs, to the acceleration sensor 63, a control instruction for the acceleration sensor 63. In the exemplary embodiment described herein, the acceleration sensor 63 is, for example, an electrostatic capacitance type MEMS acceleration sensor. However, in another exemplary embodiment, another type of acceleration sensor may be used. Further, the acceleration sensor 63 may be an acceleration sensor for detecting the magnitude of acceleration in one axial direction or two axial directions.

The gyro sensor 64 is provided inside the housing 50. The gyro sensor 64 detects angular velocities around the three axes of the above-described X-axis, Y-axis, and Z-axis, respectively. Angular velocity data representing the detected angular velocities is outputted to the UI controller 65. The UI controller 65 outputs, to the gyro sensor 64, a control instruction for the gyro sensor 64. Any number and any combination of gyro sensors may be used as long as the angular velocities around three axes are detected. The gyro sensor 64 may include a two-axes gyro sensor and a one-axis gyro sensor, like the gyro sensor 48. Alternatively, the gyro sensor 64 may be a gyro sensor for detecting an angular velocity around one axis or two axes.

The vibrator 79 is, for example, a vibration motor or a solenoid. The vibrator 79 is connected to the UI controller 65. The terminal device 7 is vibrated by actuating the vibrator 79 according to an instruction from the UI controller 65. The vibration is conveyed to the user's hand holding the terminal device 7. Thus, a so-called vibration-feedback game is realized.

The UI controller 65 outputs, to the codec LSI 66, the operation data (the terminal operation data) including the touch position data, the stick data, the operation button data, the orientation data, the acceleration data, and the angular velocity data, which have been received from the respective components. If another device is connected to the terminal device 7 through the extension connector 58, data representing operation on the other device may be also included in the operation data.

The codec LSI 66 is a circuit for subjecting data to be transmitted to the game apparatus 3 to a compression process, and subjecting data transmitted from the game apparatus 3 to a decompression process. The LCD 51, the camera 56, the sound IC 68, the wireless module 70, the flash memory 73, and the infrared communication module 72 are connected to the codec LSI 66. The codec LSI 66 includes a CPU 77 and an internal memory 78. Although the terminal device 7 is configured not to perform a game process, the terminal device 7 needs to execute at least a program for managing the terminal device 7 and a program for communication. A program stored in the flash memory 73 is loaded into the internal memory 78 and executed by the CPU 77 when the terminal device 7 is powered on, thereby starting up the terminal device 7. A part of the area of the internal memory 78 is used as a VRAM for the LCD 51.

The camera 56 takes an image in accordance with an instruction from the game apparatus 3, and outputs data of the taken image to the codec LSI 66. The codec LSI 66 outputs, to the camera 56, a control instruction for the camera 56, such as an instruction to take an image. The camera 56 is also capable of taking a moving picture. That is, the camera 56 is capable of repeatedly performing image taking, and repeatedly outputting image data to the codec LSI 66.

The sound IC 68 is connected to the loudspeakers 67 and the microphone 69. The sound IC 68 is a circuit for controlling input of sound data from the microphone 69 to the codec LSI 66 and output of sound data to the loudspeakers 67 from the codec LSI 66. Specifically, when the sound IC 68 receives sound data from the codec LSI 66, the sound IC 68 performs D/A conversion on the sound data, and outputs a resultant sound signal to the loudspeakers 67 to cause the loudspeakers 67 to output sound. The microphone 69 detects sound (such as user's voice) propagated to the terminal device 7, and outputs a sound signal representing the sound to the sound IC 68. The sound IC 68 performs A/D conversion on the sound signal from the microphone 69, and outputs a predetermined form of sound data to the codec LSI 66.

The codec LSI 66 transmits the image data from the camera 56, the sound data from the microphone 69, and the operation data from the UI controller 65, as the terminal operation data, to the game apparatus 3 through the wireless module 70. In the exemplary embodiment described herein, the codec LSI 66 subjects the image data and the sound data to a compression process similar to that performed by the codec LSI 27. The compressed image data and sound data, and the terminal operation data are outputted to the wireless module 70 as transmission data. The antenna 71 is connected to the wireless module 70, and the wireless module 70 transmits the transmission data to the game apparatus 3 through the antenna 71. The wireless module 70 has the same function as the terminal communication module 28 of the game apparatus 3. That is, the wireless module 70 has a function of connecting to a wireless LAN by a method based on, for example, the IEEE802.11n standard. The transmitted data may be encrypted according to need, or may not be encrypted.

As described above, the transmission data transmitted from the terminal device 7 to the game apparatus 3 includes the operation data (the terminal operation data), the image data, and the sound data. If another device is connected to the terminal device 7 through the extension connector 58, data received from the other device may be also included in the transmission data. The infrared communication module 72 performs infrared communication with another device based on, for example, the IRDA standard. The codec LSI 66 may include, in the transmission data, data received by the infrared communication, and transmit the transmission data to the game apparatus 3, according to need.

As described above, the compressed image data and sound data are transmitted from the game apparatus 3 to the terminal device 7. These data are received by the codec LSI 66 through the antenna 71 and the wireless module 70. The codec LSI 66 decompresses the received image data and sound data. The decompressed image data is outputted to the LCD 51, and an image is displayed on the LCD 51. On the other hand, the decompressed sound data is outputted to the sound IC 68, and the sound IC 68 outputs sound through the loudspeakers 67.

When control data is included in the data received from the game apparatus 3, the codec LSI 66 and the UI controller 65 issue control instructions for the respective components, according to the control data. As described above, the control data represents control instructions for the respective components (in the exemplary embodiment described herein, the camera 56, the touch panel controller 61, the marker section 55, the sensors 62 to 64, the infrared communication module 72, and the vibrator 79) included in the terminal device 7. In the exemplary embodiment describe herein, the control instructions represented by the control data are considered to be instructions to start and halt (stop) the operations of the above-mentioned components. That is, some components which are not used for a game may be halted to reduce power consumption. In this case, data from the halted components are not included in the transmission data transmitted from the terminal device 7 to the game apparatus 3. Since the marker section 55 is implemented as infrared LEDs, the marker section 55 is controlled by simply turning on/off the supply of power thereto.

As described above, the terminal device 7 includes the operation means such as the touch panel 52, the analog stick 53, and the operation button 54. In another exemplary embodiment, however, the terminal device 7 may include other operation means instead of or in addition to these operation means.

The terminal device 7 includes the magnetic sensor 62, the acceleration sensor 63, and the gyro sensor 64 as sensors for calculating the movement (including the position and the attitude, or a change in the position and the attitude) of the terminal device 7. In another exemplary embodiment, however, the terminal device 7 may include one or two of these sensors. In still another exemplary embodiment, the terminal device 7 may include other sensors instead of or in addition to these sensors.

The terminal device 7 includes the camera 56 and the microphone 69. In another exemplary embodiment, however, the terminal device 7 may not include the camera 56 and the microphone 69, or may include either of the cameral 56 and the microphone 69.

The terminal device 7 includes the marker section 55 as a component for calculating the positional relation between the terminal device 7 and the main controller 8 (such as the position and/or the attitude of the terminal device 7 as viewed from the main controller 8). In another exemplary embodiment, however, the terminal device 7 may not include the marker section 55. In still another exemplary embodiment, the terminal device 7 may include other means as a component for calculating the above-mentioned positional relation. For example, in another exemplary embodiment, the main controller 8 may include a marker section, and the terminal device 7 may include an image pickup element. In this case, the marker device 6 may include an image pickup element instead of an infrared LED.

5. Outline of Game Process

Next, an outline of a game process executed by the game system 1 according to the exemplary embodiment will be described. A game described in the exemplary embodiment is a tag game played by a plurality of players. In the exemplary embodiment, one terminal device 7 and a plurality of the controllers 5 are connected to the game apparatus 3 by wireless communication. For example, up to four controllers 5 can be connected to the game apparatus 3, and the game may be played by up to five players. Hereinafter, a case will be described in which a game is played by three persons, that is, a first player operating the terminal device 7, a second player A operating a controller 5a, and a second player B operating a controller 5b. In the game described in the exemplary embodiment, the controller 5 including the sub-controller 9 connected to the main controller 8 may be used, or only the main controller 8 may be used as the controller 5 without connecting the sub-controller 9 to the main controller 8.

Figure 12:
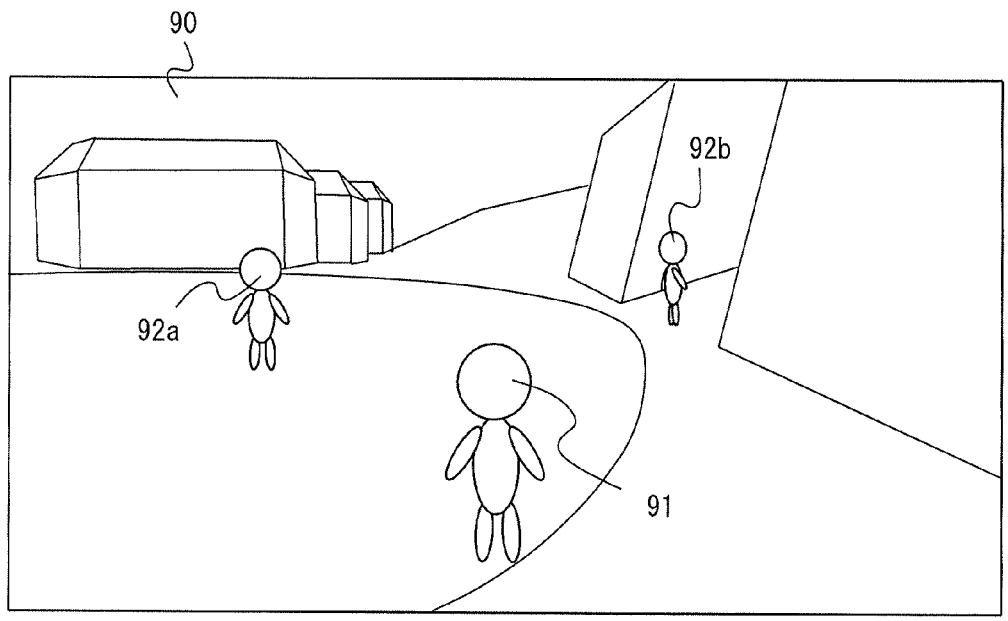
FIG. 12 shows a non-limiting exemplary game image which is displayed on a screen of a television 2 when a game according to the exemplary embodiment is executed.

FIG. 12 shows a non-limiting exemplary game image which is displayed on the screen of the television 2 when the game according to the exemplary embodiment is executed. As shown in FIG. 12, a game image 90 is formed in which a first character 91, a second character 92a, and a second character 92b are positioned in a virtual game space (a virtual space). The first character 91 is a virtual character that acts as "it", and is controlled by the first player operating the terminal device 7. The second character 92a is a virtual character that gets away from "it", and is controlled by the second player A operating the controller 5a. The second character 92b is a virtual character that gets away from "it", and is controlled by the second player B operating the controller 5b. Hereinafter, the characters that get away from "it" may be collectively referred to as the "second character".

Images of the game space as viewed from a point of view of each character may be displayed on the screen of the television 2. For example, the screen may be divided into a plurality of regions, and an image of the game space as viewed from a point of view of each character may be displayed in a corresponding one of the regions. Further, only a plurality of images of the game space as viewed from a point of view of each second character may be displayed on the screen of the television 2. In this case, an image of the game space as viewed from a point of view of the first character may be displayed on the LCD 51 of the terminal device 7. Alternatively, an image of the entirety of the game space as viewed from above the game space may be displayed on the LCD 51 of the terminal device 7.

In the exemplary embodiment, the first player inputs a direction by using any of the cross button 54A, the left analog stick 53A, or the right analog stick 53B of the terminal device 7, thereby moving the first character 91 in the game space. The first player moves the first character 91, so as to catch the second character 92a and the second character 92b. On the other hand, the second player A inputs a direction by using the cross button 32a of the controller 5a (the main controller 8a) or the analog joystick 81 of the controller 5a (the sub-controller 9a), thereby moving the second character 92a in the game space. The second player A moves the second character 92a in the game space so as to prevent the second character 92a from being caught by the first character 91. Similarly, the second player B inputs a direction by using the cross button 32a of the controller 5b or the analog joystick 81 of the controller 5b, so as to move the second character 92b in the game space, thereby enabling the second character 92b to get away from the first character 91.

Hereinafter, a control of the second character performed when the cross button 32a of the controller 5 is pressed will be described.

Figure 13:
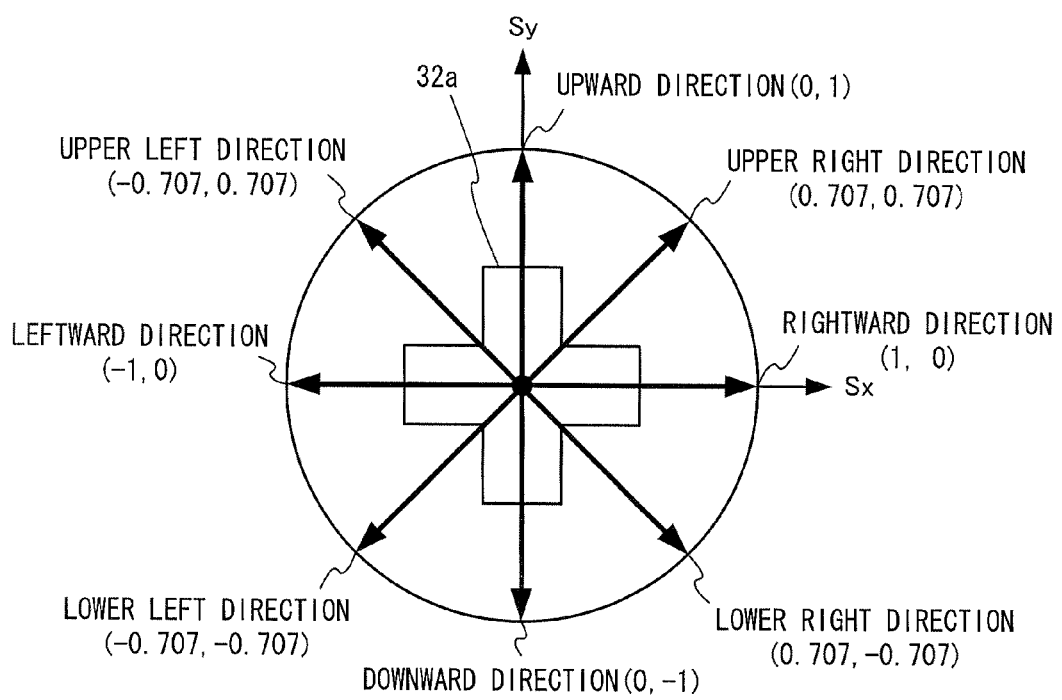
FIG. 13 shows a non-limiting example of an input vector S1 which indicates an input direction obtained when a cross button 32a is pressed.

FIG. 13 shows a non-limiting example of an input vector S1 which indicates an input direction obtained when the cross button 32a is pressed. As shown in FIG. 13, an input onto the cross button 32a is represented as a two-dimensional unit vector (the input vector S1). The input vector S1 is represented as coordinate values (sx, sy) in an SxSy coordinate system in which an Sx axis represents the rightward/leftward direction and an Sy axis represents the upward/downward direction. For example, when the cross button 32a is pressed to designate the upward direction, the input vector S1 indicates (0, 1), and when the cross button 32a is pressed to designate the rightward direction, the input vector S1 indicates (1,0). Further, when the cross button 32a is pressed to designate the downward direction, the input vector S1 indicates (0, −1), and when the cross button 32a is pressed to designate the leftward direction, the input vector S1 indicates (−1,0). In the exemplary embodiment described herein, these four directions, that is, the upward, the downward, the leftward, and the rightward directions may be collectively referred to as a "first direction". When the cross button 32a is not pressed, the input vector S1 indicates (0,0).

Further, when the cross button 32a is pressed to designate the upper right direction, the input vector S1 indicates (0.707, 0.707), and when the cross button 32a is pressed to designate the lower right direction, the input vector S1 indicates (0.707, −0.707). Further, when the cross button 32a is pressed to designate the upper left direction, the input vector S1 indicates (−0.707, 0.707), and when the cross button 32a is pressed to designate the lower left direction, the input vector S1 indicates (−0.707, −0.707). In the exemplary embodiment described herein, these four diagonal directions (the upper right direction, the lower right direction, the upper left direction, and the lower left direction) may be collectively referred to as a "second direction".

In the exemplary embodiment described herein, the controller 5 calculates the input vector S1 according to a direction designated by the cross button 32a being pressed, and outputs a value of the input vector S1 to the game apparatus 3. For example, when buttons representing the upper direction and the rightward direction are pressed on the cross button 32a, the controller 5 outputs, to the game apparatus 3, a value of the input vector S1 indicating (0.707, 0.707). It is to be noted that one direction (for example, the upper direction) and a direction (for example, the lower direction) opposite to the one direction are not simultaneously pressed on the cross button 32a. Further, the controller 5 may transmits, to the game apparatus 3, information (information about ON/OFF) indicating a direction designated by the cross button 32a being pressed, and the game apparatus 3 may calculates a value of the input vector S1 based on the information.

The game apparatus 3 calculates a virtual stick vector V based on the input vector S1 (sx, sy) outputted from the controller 5. The "virtual stick vector" is a two-dimensional vector indicating an input direction represented by a virtual analog stick (virtual stick) defined in the game apparatus 3. The length of the virtual stick vector V is up to one. The game apparatus 3 does not use the input vector S1 outputted from the controller 5 as it is for controlling movement of the second character. The game apparatus 3 transforms the input vector S1 into the virtual stick vector V, and uses the virtual stick vector V to control the movement of the second character. The virtual stick vector V is changed so as to follow the input vector S1. For example, when the input vector S1 changes in value from (1,0) to (0.707, 0.707), the virtual stick vector V changes in value from (1,0) to (0.707, 0.707) over a predetermined time period.

Specifically, when the input vector S1 indicates the first direction (the upward, the downward, the leftward, or the rightward), the virtual stick vector V changes relatively fast such that a direction indicated by the virtual stick vector V is changed from a direction indicated by the most recent virtual stick vector to a direction indicated by the input vector S1. On the other hand, when the input vector S1 indicates the second direction (the diagonal direction; the upper right direction, the lower right direction, the upper left direction, or the lower left direction), the virtual stick vector V changes relatively slowly such that a direction indicated by the virtual stick vector V is changed from a direction indicated by the most recent virtual stick vector to a direction indicated by the input vector S1.

Figure 14A:
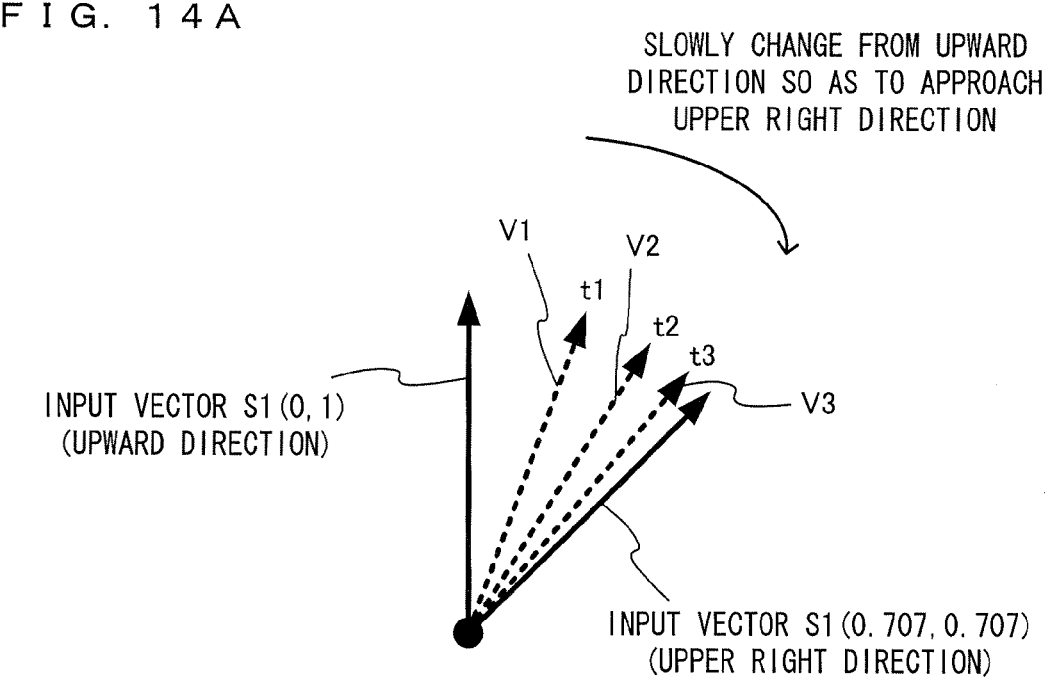
FIG. 14A shows a non-limiting exemplary state in which a virtual stick vector V changes when an input direction designated on the cross button 32a changes from the upward direction to the upper right direction.
Figure 14B:
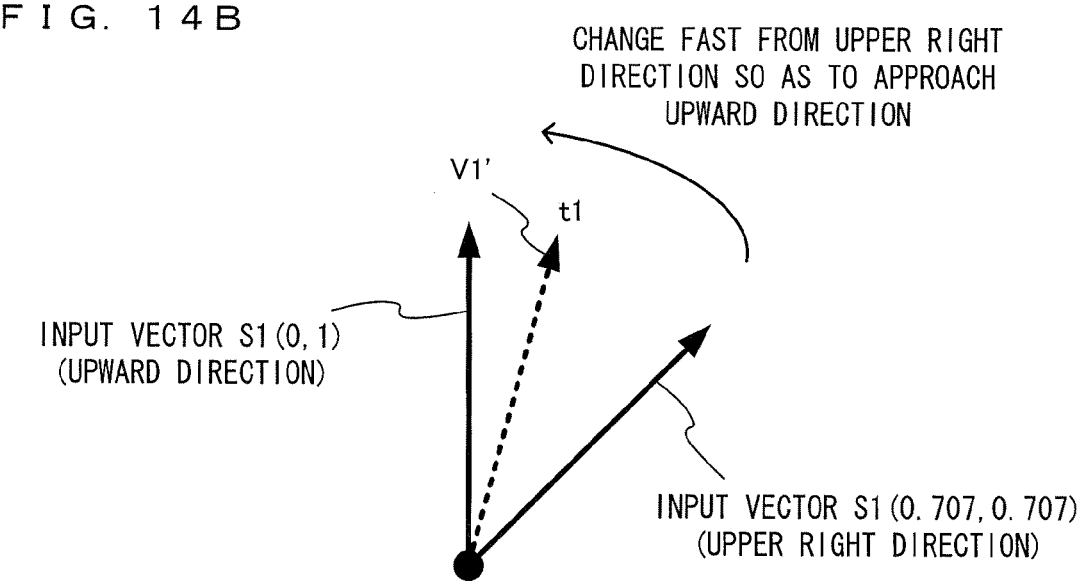
FIG. 14B shows a non-limiting exemplary state in which the virtual stick vector V changes when an input direction designated on the cross button 32a changes from the upper right direction to the upward direction.

FIG. 14A shows a non-limiting exemplary state in which the virtual stick vector V changes when an input direction designated on the cross button 32a changes from the upward direction to the upper right direction. FIG. 14B shows a non-limiting exemplary state in which the virtual stick vector V changes when an input direction designated on the cross button 32a changes from the upper right direction to the upward direction.

As shown in FIG. 14A, in a case where a value of the input vector S1 changes from (0, 1) to (0.707, 0.707) at a time t0, the virtual stick vector V changes in value relatively slowly from (0, 1) to (0.707, 0.707) without changing fast. Specifically, the virtual stick vector is represented as V1 at a time t1 (t0+td) when a predetermined time (td) has elapsed from the time t0 at which the value of the input vector S1 has changed. At a time t2 (t0+2 td) when the time has further elapsed, the virtual stick vector is represented as V2. At a time t3 (t0+3 td), the virtual stick vector is represented as V3. For example, at a time t4 (t0+4 td), the direction of the virtual stick vector becomes equal to the direction of the input vector S1 (0.707, 0.707) indicating the upper right direction.

On the other hand, as shown in FIG. 14B, in a case where a value of the input vector S1 changes from (0.707, 0.707) to (0, 1) at a time t0, the virtual stick vector V changes relatively fast. Specifically, at a time t1 (t0+td) when a predetermined time (td) has elapsed from the time t0 at which the value of the input vector S1 has changed, the virtual stick vector is represented as V1'. For example, at a time t2 (t0+2 td), the direction of the virtual stick vector becomes equal to the direction of the input vector S1 (0, 1) indicating the upward direction.

A direction in which the second character is moved is determined according to the virtual stick vector V calculated based on the input vector S1. Specifically, a direction in which the second character is moved in the game space is determined such that a direction indicated by the virtual stick vector V and a moving direction represented when the second character is displayed on the screen, become equal to each other. For example, when the direction indicated by the virtual stick vector V is the upward direction (0, 1), the second character is moved in the depth direction (in the imaging direction of a virtual camera) in the screen. Further, for example, when the direction indicated by the virtual stick vector V is the rightward direction (1, 0), the second character is moved rightward on the screen. Further, a speed at which the second character is moved is determined according to the length of the virtual stick vector V. A method for calculating the virtual stick vector V will be described below in detail.

Thus, in the exemplary embodiment described herein, the virtual stick vector V is changed so as to follow a value of the input vector S1 based on an input onto the cross button 32a. Specifically, when the input vector S1 outputted from the controller 5 indicates the upward, downward, leftward, or rightward direction (the first direction), the virtual stick vector V changes relatively fast such that a direction having been most recently obtained is changed to the direction indicated by the input vector S1. On the other hand, when the input vector S1 outputted from the controller 5 indicates a diagonal direction (the second direction), the virtual stick vector V changes relatively slowly such that a direction having been most recently obtained is changed to the direction indicated by the input vector S1.

Thus, also when the second player moves the second character by using the cross button 32a, the second player is allowed to easily move the second character in an intended direction. Namely, when the second player desires to change a moving direction of the second character so as to be slightly curved rightward in a state where the second character is being moved in the depth direction in the screen by the upward direction having been designated on the cross button 32a, the second player presses the cross button 32a to designate the upper right direction, so that the virtual stick vector V gradually changes so as to indicate the diagonally upper right direction. Thus, the second character can be smoothly turned in the rightward direction. On the other hand, for example, when it is desired that the second character is moved straight in the depth direction in the screen while the second character is being turned in the rightward direction, the second player presses the cross button 32a to designate the upward direction. In this case, if the virtual stick vector V changes slowly so as to indicate the upward direction, the second character changes slowly from a turning state to a state in which the second character is moved straight in the depth direction in the screen. Therefore, the second character is turned more greatly than is intended by the second player, and the second player cannot move the second character straight in a direction intended by the second player. However, in the exemplary embodiment described herein, when the cross button 32a is pressed to designate the upward direction, the virtual stick vector V changes fast so as to indicate the upward direction, thereby allowing the second player to move the second character straight as intended.

When an input is made with the analog joystick 81, the controller 5 outputs values (sx2, sy2) of an input vector S2 to the game apparatus 3. The input vector S2 is a two-dimensional unit vector representing an input direction (any of directions including the upward, the downward, the leftward, and the rightward directions) indicated by the analog joystick 81. Each of the values, sx2 and sy2, may be any value. When no input is made with the analog joystick 81, values of the input vector S2 indicate (0,0). When the input vector S2 having a length that is other than zero is outputted from the controller 5, the game apparatus 3 sets the input vector S2 as the virtual stick vector V.

A case in which the cross button 32a of the controller 5 is operated is described above. The same can be said for a case in which the cross button 54A of the terminal device 7 is operated. Namely, when the cross button 54A of the terminal device 7 is operated, the virtual stick vector corresponding to the cross button 54A is calculated, and movement of the first character 91 is controlled based on the virtual stick vector.

6. Details of Game Process

Figure 15:
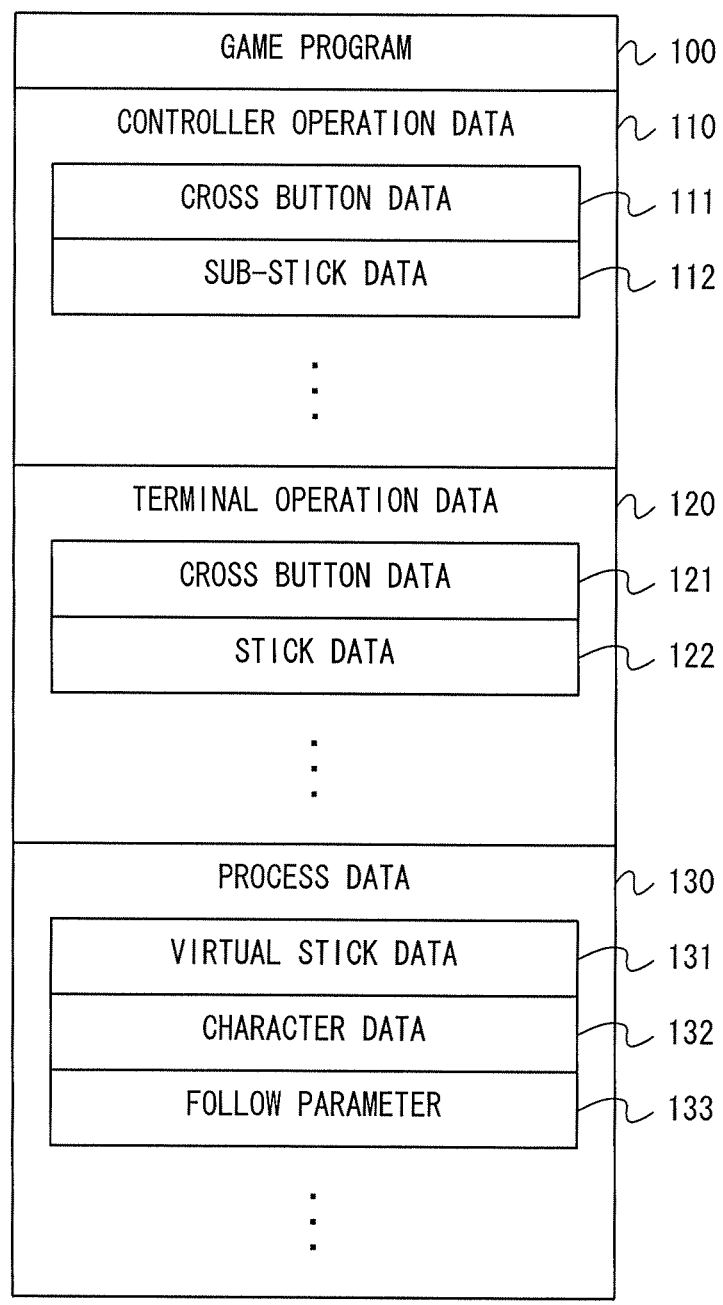
FIG. 15 shows a non-limiting example of various data used in a game process.

Next, a game process executed in the game system according to the exemplary embodiment will be described in detail. Firstly, various data used in the game process will be described. FIG. 15 shows a non-limiting example of various data used in the game process. FIG. 15 shows a non-limiting example of main data stored in the main memory (the external main memory 12 or the internal main memory 11e) of the game apparatus 3. As shown in FIG. 15, a game program 100, controller operation data 110, terminal operation data 120, and process data 130 are stored in the main memory of the game apparatus 3. In addition to the data shown in FIG. 15, data used in the game such as image data representing various objects appearing in the game, and sound data used in the game are stored in the main memory.

A portion or the entirety of programs in the optical disc 4 is loaded as the game program 100 according to need after the game apparatus 3 is powered on, and the game program 100 is stored in the main memory. The game program 100 may be obtained from the flash memory 17 or an external device outside the game apparatus 3 (via, for example, the Internet), instead of from the optical disc 4. Further, a portion (for example, a program for calculating the virtual stick vector) of the game program 100 may be previously stored in the game apparatus 3.

The controller operation data 110 represents an operation performed by a user (the second player) on the controller 5, and is outputted (transmitted) from the controller 5 based on the operation on the controller 5. The controller operation data 110 is transmitted by the controller 5, received by the game apparatus 3, and stored in the main memory. The controller operation data 110 includes cross button data 111 and sub-stick data 112. In addition to the data described above, the controller operation data 110 includes, for example, data indicating whether other operation buttons (such as operation buttons 32b to 32i) are pressed, main acceleration data representing an acceleration detected by the acceleration sensor 37 of the controller 5, and marker coordinate data representing a coordinate calculated by the image processing circuit 41 of the controller 5. Further, since the game apparatus 3 obtains the operation data from a plurality of the controllers 5 (specifically, the controllers 5a and 5b), the game apparatus 3 stores, in the main memory, the controller operation data 110 transmitted from each controller 5. A predetermined amount of the controller operation data 110 which has been received prior to the most recent data (which have been most recently received) may be chronologically stored for each controller 5.

The cross button data 111 represents a direction, among the four directions and diagonal directions represented by the cross button 32a of the controller 5, which has been designated by the cross button 32a being pressed. In the exemplary embodiment described herein, the cross button data 111 represents the input vector S1 (sx, sy).

The sub-stick data 112 represents an operation on the analog joystick 81 of the controller 5 (the sub-controller 9). Specifically, the sub-stick data 112 represents the input vector S2 (sx2, sy2) which is a two-dimensional vector and indicates an input direction (tilt direction) detected by the analog joystick 81.

The terminal operation data 120 represents an operation performed by a user (the first player) on the terminal device 7, and is outputted (transmitted) from the terminal device 7 based on the operation on the terminal device 7. The terminal operation data 120 is transmitted by the terminal device 7, received by the game apparatus 3, and stored in the main memory. The terminal operation data 120 includes cross button data 121 and stick data 122. In addition to the data described above, the terminal operation data 120 includes: data indicating whether each operation button has been pressed; touch data representing a touch position on the touch panel 52; acceleration data representing an acceleration detected by the acceleration sensor 63 of the terminal device 7; and orientation data representing an orientation detected by the magnetic sensor 62 of the terminal device 7, for example. Further, when the game apparatus 3 obtains the terminal operation data from a plurality of the terminal devices 7, the game apparatus 3 may store the terminal operation data 120 transmitted from each of the terminal devices 7, in the main memory, for each terminal device 7.

The cross button data 121 represents a direction, among the four directions and diagonal directions represented by the cross button 54A of the terminal device 7, which has been designated by the cross button 54A being pressed. In the exemplary embodiment described herein, the cross button data 121 represents a vector indicating an input direction in an input onto the cross button 54A.

The stick data 122 represents an operation on the left analog stick 53A or the right analog stick 53B of the terminal device 7. Specifically, the stick data 122 represents a two-dimensional vector indicating an input direction (sliding direction or tilt direction) in an input onto the analog stick 53.

The process data 130 is used in the game process (FIG. 16) described below. The process data 130 includes virtual stick data 131, character data 132, and a follow parameter 133. In addition to the data shown in FIG. 15, the process data 130 includes various data used in the game process, such as data representing various parameters set for various objects appearing in the game.

The virtual stick data 131 represents the virtual stick vector V (Vx, Vy). The virtual stick data corresponding to the terminal device 7 and each of the controllers 5 is stored in the main memory. Namely, the virtual stick data corresponding to the controller 5a, the virtual stick data corresponding to the controller 5b, and the virtual stick data corresponding to the terminal device 7 are stored in the main memory.

The character data 132 represents a position and an attitude of each character in the game space.

The follow parameter 133 is a follow parameter K used for calculating the virtual stick vector V.

Next, a game process executed by the game apparatus 3 will be described in detail with reference to FIG. 16 and FIG. 17. FIG. 16 is a main flow chart showing a non-limiting exemplary flow of a game process executed by the game apparatus 3. When the game apparatus 3 is powered on, the CPU 10 of the game apparatus 3 executes a start-up program stored in a boot ROM which is not shown, thereby initializing the respective units such as the main memory. A game program stored in the optical disc 4 is loaded into the main memory, and the execution of the game program is started by the CPU 10. FIG. 16 is a flow chart showing a non-limiting exemplary process performed after the above-described process has been completed. The game apparatus 3 may be structured so as to execute the game program soon after power on, or may be structured so as to execute an internal program for displaying a predetermined menu screen after power on, and thereafter execute the game program in accordance with an instruction for starting the game being issued by, for example, a user's selection operation on the menu screen.

Figure 17:
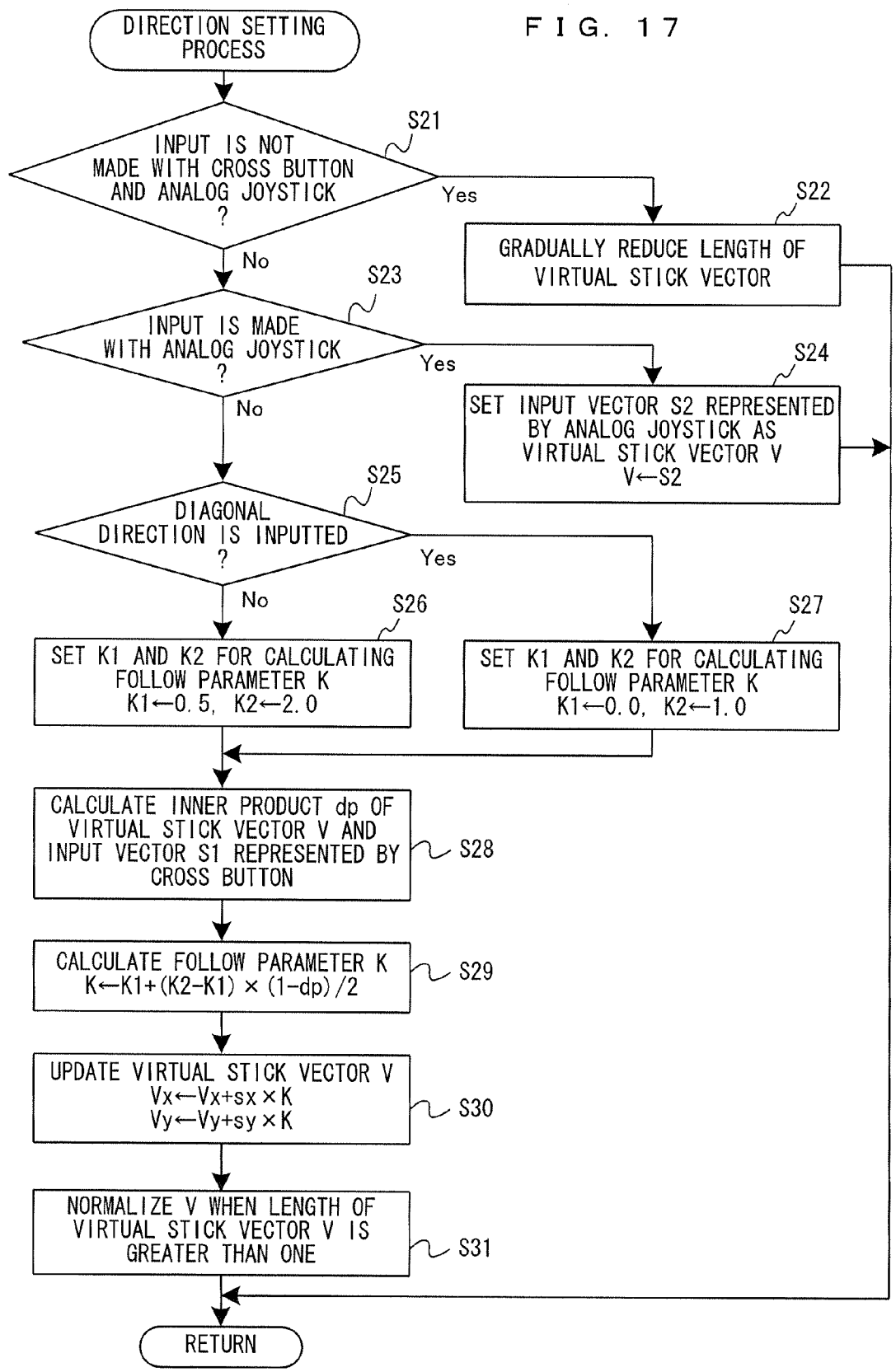
FIG. 17 is a flow chart showing in detail a non-limiting exemplary flow of a direction setting process (step S13) shown in FIG. 16.

Process steps in the flow charts shown in FIG. 16 and FIG. 17 are merely examples, and the order in which the process steps are performed may be changed if the same result is obtained. Further, values of variables and constants, and the like are merely examples, and other values may be used according to need. Further, in the exemplary embodiment described herein, the CPU 10 executes the process steps shown in the flow charts. However, some of the process steps shown in the flow charts may be executed by a processor or a dedicated circuit other than the CPU 10.

Firstly, in step S11, the CPU 10 executes an initialization process. In the initialization process, a virtual game space is constructed, various objects (such as the first character, the second character, the virtual camera, and other objects) appearing in the game space are positioned at initial positions, and initial values of various parameters used in the game process are set. Further, in the initialization process, the virtual stick data 131 is initialized. Namely, the virtual stick vector V is initialized as (0,0).

Further, after the process step of step S11, a process loop of a series of process steps from step S12 to step S17 is repeatedly executed every predetermined time period (every one frame time. For example, every 1/60 seconds).

In step S12, the CPU 10 obtains the operation data (the input vector S1, the input vector S2, and the like) which has been transmitted from the terminal device 7 and two controllers 5, and has been stored in the main memory. The terminal device 7 and each of the controllers 5 repeatedly transmit, to the game apparatus 3, the operation data (the terminal operation data and the controller operation data). In the game apparatus 3, the terminal communication module 28 sequentially receives the terminal operation data, and the terminal operation data having been received is sequentially stored in the main memory by the input/output processor 11a. Further, the controller communication module 19 sequentially receives the controller operation data for each controller 5, and the controller operation data having been received is sequentially stored in the main memory by the input/output processor 11a. A time interval of transmission or reception between the controller 5 and the game apparatus 3, and a time interval of transmission or reception between the terminal device 7 and the game apparatus 3 are preferably each shorter than a game process time period, and are each 1/200 seconds, for example. In step S12, the CPU 10 reads, from the main memory, the controller operation data 110 and the terminal operation data 120 which have been most recently obtained. Subsequent to step S12, a process step of step S13 is executed.

In step S13, the CPU 10 executes a direction setting process. The direction setting process is a process for calculating a moving direction in which each virtual character is moved, and is a process for setting the virtual stick vector V. The direction setting process of step S13 is performed for the input devices corresponding to the characters, respectively, namely, for each of the terminal device 7, the controller 5a, and the controller 5b. It is to be noted that setting of the virtual stick vector corresponding to the controller 5 will be described below. However, the same process is performed for the terminal device 7, to set the virtual stick vector corresponding to the terminal device 7. Hereinafter, the direction setting process will be described in detail with reference to FIG. 17.

FIG. 17 is a flow chart showing in detail a non-limiting exemplary flow of the direction setting process (step S13) shown in FIG. 16.

In step S21, the CPU 10 determines whether input is not made with the cross button 32a and the analog joystick 81. Specifically, the CPU 10 determines, with reference to the cross button data 111 and the sub-stick data 112, whether input has not been made with the cross button 32a and the analog joystick 81 of the controller 5. More specifically, when the input vector S1 for the cross button 32a having been obtained in step S12 indicates (0,0), and the input vector S2 for the analog joystick 81 having been obtained in step S12 indicates (0,0), the CPU 10 determines that input has not been made with the cross button 32a and the analog joystick 81. When the CPU 10 determines that input has not been made with the cross button 32a and the analog joystick 81, the CPU 10 subsequently executes a process step of step S22. Otherwise, the CPU 10 subsequently executes a process step of step S23.

In step S22, the CPU 10 gradually reduces the length of the virtual stick vector V. The process step of step S22 is performed for changing the length of the virtual stick vector V so as to approach zero when input is not made with the cross button 32a and the analog joystick 81. Specifically, when a length Len of the virtual stick vector V (Vx, Vy) represented by the virtual stick data 131 is less than a predetermined value d, the CPU 10 sets the length Len of the virtual stick vector V to zero (namely, sets each of Vx and Vy as zero). On the other hand, when the length Len of the virtual stick vector V (Vx, Vy) is greater than or equal to the predetermined value d, the CPU 10 calculates the virtual stick vector V (Vx, Vy) based on the following equation (1) and equation (2).

$$Vx \leftarrow Vx - Vx \times d/\text{Len} \quad (1)$$

$$Vy \leftarrow Vy - Vy \times d/\text{Len} \quad (2)$$

The virtual stick vector V having been updated based on equation (1) and equation (2) is stored as the virtual stick data 131 in the main memory. The CPU 10 ends, after the process step of step S22, the direction setting process shown in FIG. 17.

On the other hand, in step S23, the CPU 10 determines, with reference to the sub-stick data 112, whether input has been made with the analog joystick 81. Specifically, the CPU 10 determines whether the length of the input vector S2 having been obtained in step S12 is zero. When input has been made with the analog joystick 81, the CPU 10 subsequently executes a process step of step S24. When input is not made with the analog joystick 81, the CPU 10 subsequently executes a process step of step S25.

In step S24, the CPU 10 sets, as the virtual stick vector V, the input vector S2 having been obtained in step S12, and stores the virtual stick vector V in the main memory. The CPU 10 ends, after the process step of step S24, the direction setting process shown in FIG. 17.

In step S25, the CPU 10 determines whether an input direction detected by the cross button 32a represents a diagonal direction. The process step of step S25 is performed when determination result in step S21 and determination result in step S23 indicate No, namely, when input is being made with the cross button 32a. Specifically, the CPU 10 determines, with reference to the cross button data 111, whether the input vector S1 indicates a diagonal direction (the second direction; the upper right direction, the lower right direction, the lower left direction, or the upper left direction). When the determination result is negative, the CPU 10 subsequently executes a process step of step S26. When the determination result is affirmative, the CPU 10 subsequently executes a process step of step S27.

In step S26, the CPU 10 sets parameters K1 and K2 for calculating the follow parameter K. Specifically, the CPU 10 sets K1 as 0.5, and sets K2 as 2.0. The follow parameter K is a parameter indicating a degree to which the virtual stick vector V is changed so as to approach the input vector S1, and is used in a process step of step S29 described below. Further, K1 represents a minimal value of K, and K2 represents a maximal value of K. The process step of step S26 is executed when the input onto the cross button 32a does not represent a diagonal direction, namely, when the input onto the cross button 32a represents one of the four directions (the first direction; one of the upward direction, the downward direction, the leftward direction or the rightward direction) represented by the cross button 32a. Therefore, for changing the virtual stick vector V so as to approach the input vector S1 fast (for enhancing a rate at which the virtual stick vector V is changed so as to approach the input vector S1), K1 and K2 are set to the values described above. After the process step of step S26, the CPU 10 subsequently executes a process step of step S28.

In step S27, the CPU 10 sets parameters K1 and K2 for calculating the follow parameter K. Specifically, the CPU 10 sets K1 as 0.0, and sets K2 as 1.0. The process step of step S27 is executed when the input onto the cross button 32a represents a diagonal direction (the second direction; one of the upper right direction, the lower right direction, the upper left direction, or the lower left direction). Therefore, for changing the virtual stick vector V so as to slowly approach the input vector S1 (for reducing a rate at which the virtual stick vector V is changed so as to approach the input vector S1), K1 and K2 are set to the values described above. After the process step of step S27, the CPU 10 subsequently executes the process step of step S28.

In step S28, the CPU 10 calculates an inner product dp of the virtual stick vector V and the input vector S1 with reference to the virtual stick data 131 and the cross button data 111. The CPU 10 subsequently executes a process step of step S29.

In step S29, the CPU 10 calculates the follow parameter K. Specifically, the CPU 10 calculates the follow parameter K based on the following equation (3).

$$K \leftarrow K1 + (K2 - K1) \times (1 - dp)/2 \quad (3)$$

dp represents an inner product of the virtual stick vector V and the input vector S1, which has been calculated in step S28. Further, K1 and K2 represent values set in step S26 or step S27. For example, when the inner product dp indicates 1, namely, when an angle between the virtual stick vector V and the input vector S1 is zero degrees, K is represented as K1, which is a minimal value. Further, when the inner product dp indicates −1, namely, when an angle between the virtual stick vector V and the input vector S1 is 180 degrees, K is represented as K2, which is a maximal value. According to equation (3), the closer a direction of a player's input which is represented by the input vector S1 is to a direction indicated by the virtual stick vector V having been most recently updated, the closer a value of the follow parameter K is to the minimal value. In contrast, the greater a difference between an input direction indicated by the input vector S1 and a direction indicated by the virtual stick vector V having been most recently updated is (the closer the input direction is to a direction opposite to the direction indicated by the virtual stick vector V having been most recently updated), the closer a value of the follow parameter K is to the maximal value. Namely, the greater a difference between an input direction indicated by the input vector S1 and a direction indicated by the virtual stick vector V having been most recently updated is, the faster a direction indicated by the virtual stick vector V is changed so as to approach the direction indicated by the input vector S1. The CPU 10 subsequently executes a process step of step S30.

In step S30, the CPU 10 updates the virtual stick vector V based on the virtual stick vector V having been most recently updated, the input vector S1, and the follow parameter K. Specifically, the CPU 10 calculates the virtual stick vector V based on the following equation (4) and equation (5).

$$Vx \leftarrow Vx + sx \times K \quad (4)$$

$$Vy \leftarrow Vy + sy \times K \quad (5)$$

Values, Vx, Vy, are calculated as updated values according to equation (4) and equation (5), thereby updating the virtual stick vector V. As is apparent from equation (4) and equation (5), the greater the value of the follow parameter K is, the closer the virtual stick vector V is to the input vector S1. The CPU 10 subsequently executes a process step of step S31.

In step S31, when the length of the virtual stick vector V is greater than one, the CPU 10 normalizes the virtual stick vector V. Specifically, the CPU 10 determines whether the length of the virtual stick vector V calculated in step S30 is greater than one. When the length of the virtual stick vector V is greater than one, the CPU 10 normalizes the virtual stick vector V such that the length of the virtual stick vector V becomes one. When the length of the virtual stick vector V is less than or equal to one, the CPU 10 does not normalize the virtual stick vector V. After the process step of step S31, the CPU 10 ends the direction setting process shown in FIG. 17.

Returning to FIG. 16, the CPU 10 subsequently executes a process step of step S14. In step S14, the CPU 10 executes the game process. Specifically, the CPU 10 moves each character in the game space based on the virtual stick vector V having been set in step S13. For example, the CPU 10 moves the second character 92a in the game space based on the virtual stick vector V corresponding to the controller 5a. Further, for example, the CPU 10 moves the first character 91 in the game space based on the virtual stick vector corresponding to the terminal device 7. Further, the CPU 10 executes the game process according to the movement of each character. For example, the CPU 10 determines whether the first character 91 has caught the second character 92 based on a distance between the first character 91 having been moved and the second character 92 having been moved, and executes a process based on the determination result. The CPU 10 subsequently executes a process step of step S15.

In step S15, the CPU 10 executes an image generation process. Specifically, the CPU 10 takes an image of the game space by using the virtual camera positioned in the game space, to generate an image (the television game image) to be displayed by the television 2. When a plurality of virtual cameras are set so as to correspond to the characters, respectively, one television game image including a plurality of images generated by the plurality of virtual cameras is generated. Further, the CPU 10 may generate an image (the terminal game image) to be displayed by the terminal device 7. In this case, the terminal game image and the television game image may not represent the same image. The CPU 10 subsequently executes a process step of step S16.

In step S16, the CPU 10 outputs, to the television 2, the image (the television game image) generated in step S15. Further, sound data as well as the television game image is outputted to the television 2, and game sound is outputted from the speaker 2a of the television 2. When the CPU 10 generates the terminal game image, the terminal game image may be wirelessly transmitted to the terminal device 7. In this case, the CPU 10 transmits, to the codec LSI 27, the terminal game image having been generated in step S15, and the codec LSI 27 subjects the terminal game image to a predetermined compression process. Data of the image having been subjected to the compression process is transmitted via the antenna 29 to the terminal device 7 by the terminal communication module 28. The terminal device 7 receives data of the image transmitted from the game apparatus 3 by means of the wireless module 70. The codec LSI 66 subjects the received data of the image to a predetermined decompression process. The data of the image having been subjected to the decompression process is outputted to the LCD 51. Thus, the terminal game image is displayed on the LCD 51. Further, sound data as well as the terminal game image may be transmitted to the terminal device 7, and game sound may be outputted from the loudspeakers 67 of the terminal device 7. The CPU 10 subsequently executes a process step of step S17.

In step S17, the CPU 10 determines whether the game is to be ended. In the process step of step S17, for example, it is determined whether all the second characters 92 have been caught by the first character 91, or whether an instruction for stopping the game is issued by a player. When the determination result of step S17 is negative, the process step of step S12 is executed again. On the other hand, when the determination result of step S17 is affirmative, the CPU 10 ends the game process shown in FIG. 16.

As described above, the virtual stick vector V is calculated based on the input vector 51 representing an input onto the cross button. The virtual stick vector V is changed so as to follow the input vector 51. Specifically, when a direction indicated by the input vector 51 is a diagonal direction represented by the cross button, the virtual stick vector V is changed so as to relatively slowly approach the input vector S1. When a direction indicated by the input vector S1 is one of the upward, the downward, the leftward, or the rightward direction represented by the cross button, the virtual stick vector V is changed so as to approach the input vector S1 relatively fast. Thus, also when a player moves the character in the game space by using the cross button, the character can be easily moved in an intended direction.

Namely, when one of the upward, the downward, the leftward, or the rightward direction is inputted onto the cross button, it is assumed that a player intends to move the character in one of the upward, the downward, the leftward, or the rightward direction. On the other hand, when a diagonal direction is inputted onto the cross button, it is assumed that a player is adjusting a direction in which the character is moved. Therefore, when one of the upward, the downward, the leftward, or the rightward direction is inputted onto the cross button, the virtual stick vector V is changed so as to approach the input vector S1 fast, thereby changing fast a direction in which the character is moved, to a direction designated by a player. Thus, the player's intention can be reflected in the game. On the other hand, when a diagonal direction is inputted onto the cross button, the virtual stick vector V is changed so as to slowly approach the input vector S1, thereby slowly changing a direction in which the character is moved, to a direction designated by the player. Thus, the player is allowed to easily perform slight adjustment of a direction in which the character is moved, and is allowed to move the character in a direction intended by the player.

Further, in the exemplary embodiment described herein, the greater a difference between a direction indicated by the virtual stick vector V having been most recently updated and a direction indicated by the input vector S1 is, the faster the virtual stick vector V is changed so as to approach the input vector S1, thereby updating a value of the virtual stick vector V. Thus, a player's intention can be reflected with enhanced effectiveness, thereby improving operability (an effect of operation) for a player. For example, when a direction indicated by the virtual stick vector V having been most recently updated is opposite to a direction indicated by the input vector S1 (when an angle between the two vectors is 180 degrees), it is assumed that a player intends to rotate the character 180 degrees. Therefore, in this case, the virtual stick vector V having been most recently updated is changed so as to approach the input vector S1 at an increased rate, and thus the player's intention is quickly reflected, and the character can be rotated by 180 degrees. Further, for example, when a direction indicated by the virtual stick vector V having been most recently updated is close to a direction indicated by the input vector S1 (when an angle between the two vectors is relatively small), it is assumed that a player is adjusting a direction in which the character is moved. Therefore, in this case, the virtual stick vector V having been most recently updated is changed so as to slowly approach the input vector S1, thereby allowing a player to perform slight adjustment of the direction in which the character is moved.

7. Modifications

It is to be noted that the exemplary embodiments described above are examples, and another exemplary embodiment may have, for example, the features described below.

For example, in the exemplary embodiment described herein, a tag game is played by a plurality of players. In another exemplary embodiment, another game may be played by a single player. Any game in which a predetermined object is moved in the virtual space based on an input onto the cross button may be played.

Further, in the exemplary embodiment described herein, the cross button is used as the four direction switch. In another exemplary embodiment, as the four direction switch, a switch representing four diagonal directions (the upper right direction, the lower right direction, the upper left direction, and the lower left direction) may be used. In this case, the virtual stick vector V is updated so as to more slowly approach the input vector S1 when an input is made in one of the upward, the downward, the leftward, or the rightward direction (namely, a direction between two directions among the four directions represented by the four direction switch) than when an input is made in one of the four diagonal directions.

Further, in the exemplary embodiment described herein, the greater an angle between the input vector S1 and the virtual stick vector V is, the higher a rate at which the virtual stick vector V is changed so as to approach the input vector S1. Namely, the greater a difference between an input direction based on an input onto the cross button and a direction represented by the virtual stick is, the higher a rate at which the direction represented by the virtual stick is changed so as to approach the input direction. In another exemplary embodiment, a rate at which the virtual stick vector V is changed so as to approach the input vector S1 may be constant regardless of the difference described above, or may be changed according to the difference described above. For example, when an angle between the input direction and the direction represented by the virtual stick is greater than or equal to a predetermined value, a rate at which the direction represented by the virtual stick is changed so as to approach the input direction may be increased. Further, for example, when the angle between the input direction and the direction represented by the virtual stick is less than or equal to the predetermined value, a rate at which the direction represented by the virtual stick is changed so as to approach the input direction may be constant.

Further, in the exemplary embodiment described herein, when an input onto the cross button and an input onto the analog stick are made, the input vector S2 from the analog stick is set as the virtual stick vector V. Namely, when an input onto the cross button and an input onto the analog stick are made, the input onto the analog stick is preferentially handled, and the input vector S2 from the analog stick is set as the virtual stick vector V. In another exemplary embodiment, when an input onto the cross button and an input onto the analog stick are made, the input onto the cross button may be preferentially handled.

Further, in another exemplary embodiment, when an input onto the analog stick is made, the input vector S2 from the analog stick may be added to the virtual stick vector V having been most recently updated, thereby updating the virtual stick vector V. In this case, when the length of the virtual stick vector V having been updated is greater than one, the length is normalized to one.

Further, in another exemplary embodiment, a first virtual stick vector (a first control direction) may be calculated, based on an input onto the cross button, in the manner described above, and a second virtual stick vector (a second control direction) may be set based on an input onto the analog stick. In this case, the input direction represented by the analog stick may be set as the second control direction. Alternatively, the input direction represented by the analog stick may be added to the second control direction having been most recently updated, thereby updating the second control direction. A predetermined object in the game space may be controlled based on the first control direction and/or the second control direction. The second control direction and the first control direction may be the same or may be different from each other. Namely, in the game apparatus 3, one virtual stick vector V is defined, and the virtual stick vector V may be calculated as the first control direction based on an input onto the cross button, and the virtual stick vector V may be set as the second control direction based on an input onto the analog stick.

Further, in the exemplary embodiment described herein, a rate at which a direction represented by the virtual stick is changed so as to approach an input direction is changed according to whether the input direction is one of the four first directions (the four directions of the upward direction, the downward direction, the leftward direction, or the rightward direction represented by the cross button) or one of the four second directions (the diagonal directions: the four directions of the upper right direction, the lower right direction, the upper left direction, and the lower left direction). Specifically, when the input direction represents the second direction, a rate at which a direction represented by the virtual stick is changed so as to approach an input direction is reduced as compared to when the input direction represents the first direction, thereby changing the direction represented by the virtual stick so as to approach the input direction. In another exemplary embodiment, only when the input direction is a predetermined one of the four second directions (for example, when the input direction is the upper right direction or the upper left direction), the rate at which a direction represented by the virtual stick is changed so as to approach an input direction may be relatively reduced. For example, in a game in which a character can be moved in only a predetermined direction, specifically, in only the depth direction in the screen or in only the upward direction, a direction in which the character is moved may be controlled based on the virtual stick.

Furthermore, in the exemplary embodiment described herein, the controller 5 calculates the input vector S1, and the game apparatus 3 obtains the input vector S1 transmitted from the controller 5. In another exemplary embodiment, the game apparatus 3 may calculate the input vector S1 based on input information of the cross button transmitted from the controller 5, thereby obtaining the input vector S1.

Moreover, in another exemplary embodiment, in a system including a plurality of information processing apparatuses which can mutually communicate with each other, the plurality of information processing apparatuses may share and execute the process to be executed by the game apparatus 3 as described above. A process to be executed by each information processing apparatus may be determined according to need. For example, input information (the input vector S1) from an input device which has a cross button, and which is connected to a network such as the Internet may be transmitted to the information processing apparatus connected to the network. In this case, the information processing apparatus may perform the process described above based on the input information having been received, and thus calculate the virtual stick vector V, thereby controlling, for example, movement of a predetermined object based on the virtual stick vector.

Further, in another exemplary embodiment, the game apparatus 3 may be wire-connected to the controllers 5 and the terminal device 7, instead of the game apparatus 3 being wirelessly connected to the controllers 5 and the terminal device 7, thereby performing transmission and reception of information.

The program may be executed by any information processing apparatuses, such as personal computers, which are used for performing various information processing as well as the processing performed by the game apparatus 3. For example, a controller including the cross button may be connected to a personal computer or the like, and a pointer used for selecting an icon may be controlled based on the operation on the cross button.

Similarly, program instructions, data and other information for implementing the systems and methods described herein may be stored in one or more on-board and/or removable memory devices. Multiple memory devices may be part of the same device or different devices, which are co-located or remotely located with respect to each other. For example, the program may be stored in a storage medium such as a magnetic disk, and a nonvolatile memory as well as in an optical disc. The program may be stored in a computer-readable storage medium, such as a RAM or a magnetic disk, of a server connected to a network, and may be provided through the network. Further, the program may be loaded as a source code into an information processing apparatus, and may be compiled and executed when the program is executed.

Furthermore, in the exemplary embodiment described herein, the CPU 10 of the game apparatus 3 executes the game program, thereby performing the process of the flow charts described above. In another exemplary embodiment, some or the entirety of the process described above may be performed by processors that can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art. At least one processor may operate as a "programmed logic circuit" for executing the process described above.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A direction control system for setting a first control direction based on an input onto a four direction switch representing four directions, the direction control system comprising:
   a first input direction obtaining unit configured to obtain a first input direction representing either a direction between two directions among the four directions, or one of the four directions, based on the input onto the four direction switch;
   a determination unit configured to determine whether the first input direction indicates a first direction representing one of the four directions, or a second direction representing a direction between two directions among the four directions; and
   a direction setting unit configured to update the first control direction based on the first input direction, wherein the first control direction is changed to approach the first input direction such that, when the first input direction indicates the second direction, a rate at which the first control direction is changed to approach the first input direction is reduced as compared to when the first input direction indicates the first direction;
   wherein the direction setting unit is configured to change the rate at which the first control direction is changed to approach the first input direction, based on a difference between the first input direction and the first control direction.

2. The direction control system according to claim 1, wherein the direction setting unit is configured to set the rate at which the first control direction is changed to approach the first input direction such that the greater a difference between the first input direction and the first control direction having been most recently updated is, the higher the rate is.

3. The direction control system according to claim 1, further comprising an object control unit configured to control a direction of a predetermined object in a virtual space, based on the first control direction.

4. The direction control system according to claim 1, further comprising second input direction obtaining unit configured to obtain a two-dimensional second input direction based on an input onto an analog direction input section, wherein
the direction setting unit is configured to set the second input direction as a second control direction.

5. The direction control system according to claim 4, further comprising:
an operation device including the four direction switch and the analog direction input section; and
an object control unit configured to control, in accordance with an input onto the four direction switch, a direction of a predetermined object in a virtual space based on the first control direction, and controlling, in accordance with an input onto the analog direction input section, a direction of the predetermined object based on the second control direction.

6. The direction control system according to claim 4, further comprising:
a first operation device including the four direction switch;
a second operation device including the analog direction input section; and
an object control unit configured to control, in accordance with an input onto the four direction switch, a direction of a first object in a virtual space based on the first control direction, and controlling, in accordance with an input onto the analog direction input section, a direction of a second object based on the second control direction.

7. A direction control apparatus for setting a first control direction based on an input onto a four direction switch representing four directions, the direction control apparatus comprising:
a processing system, comprising at least one computer processor, the processing system being configured to:
obtain a first input direction representing either a direction between two directions among the four directions, or one of the four directions, based on the input onto the four direction switch;
determine whether the first input direction indicates a first direction representing one of the four directions, or a second direction representing a direction between two directions among the four directions; and
update the first control direction based on the first input direction, wherein the first control direction is changed to approach the first input direction such that, when the first input direction indicates the second direction, a rate at which the first control direction is changed to approach the first input direction is reduced as compared to when the first input direction indicates the first direction;
wherein the processing system is configured to change the rate at which the first control direction is changed to approach the first input direction, based on a difference between the first input direction and the first control direction.

8. A non-transitory computer-readable storage medium having stored therein a direction control program executed by a computer of a direction control apparatus for setting a first control direction based on an input onto a four direction switch representing four directions, the direction control program is configured to cause the computer to provide functionality comprising:

obtaining a first input direction representing either a direction between two directions among the four directions, or one of the four directions, based on the input onto the four direction switch;
determining whether the first input direction indicates a first direction representing one of the four directions, or a second direction representing a direction between two directions among the four directions; and
updating the first control direction based on the first input direction, wherein the first control direction is changed to approach the first input direction such that, when the first input direction indicates the second direction, a rate at which the first control direction is changed to approach the first input direction is reduced as compared to when the first input direction indicates the first direction;
wherein the direction control program is configured to cause the computer to change the rate at which the first control direction is changed to approach the first input direction, based on a difference between the first input direction and the first control direction.

9. A direction control method executed by a direction control system for setting a first control direction based on an input onto a four direction switch representing four directions, the direction control method comprising:
a first input direction obtaining step of obtaining a first input direction representing either a direction between two directions among the four directions, or one of the four directions, based on the input onto the four direction switch;
a determination step of determining whether the first input direction indicates a first direction representing one of the four directions, or a second direction representing a direction between two directions among the four directions; and
a direction setting step of updating the first control direction based on the first input direction, wherein the first control direction is changed to approach the first input direction such that, when the first input direction indicates the second direction, a rate at which the first control direction is changed to approach the first input direction is reduced as compared to when the first input direction indicates the first direction;
wherein the direction setting step changes the rate at which the first control direction is changed to approach the first input direction, based on a difference between the first input direction and the first control direction.

10. The direction control method according to claim 9, wherein the direction setting step sets the rate at which the first control direction is changed to approach the first input direction such that the greater a difference between the first input direction and the first control direction having been most recently updated is, the higher the rate is.

11. The direction control method according to claim 9, further comprising an object control step of controlling a direction of a predetermined object in a virtual space, based on the first control direction.

12. The direction control method according to claim 9, further comprising a second input direction obtaining step of obtaining a two-dimensional second input direction based on an input onto an analog direction input section, wherein
the direction setting step sets the second input direction as a second control direction.

13. The direction control method according to claim 12, wherein
the direction control system includes an operation device including the four direction switch and the analog direction input section, the direction control method further comprising
an object control step of controlling, in accordance with an input onto the four direction switch, a direction of a predetermined object in a virtual space based on the first control direction, and controlling, in accordance with an input onto the analog direction input section, a direction of the predetermined object based on the second control direction.

14. The direction control method according to claim 12, wherein
the direction control system includes:
a first operation device including the four direction switch; and
a second operation device including the analog direction input section, the direction control method further comprising
an object control step of controlling, in accordance with an input onto the four direction switch, a direction of a first object in a virtual space based on the first control direction, and controlling, in accordance with an input onto the analog direction input section, a direction of a second object based on the second control direction.

15. The direction control apparatus according to claim 7, wherein the processing system is configured to set the rate at which the first control direction is changed to approach the first input direction such that the greater a difference between the first input direction and the first control direction having been most recently updated is, the higher the rate is.

16. The direction control apparatus according to claim 7, wherein the processing system is further configured to control a direction of a predetermined object in a virtual space, based on the first control direction.

17. The direction control apparatus according to claim 7, wherein the processing system is further configured to obtain a two-dimensional second input direction based on an input onto an analog direction input section, and to set the second input direction as a second control direction.

18. The non-transitory computer-readable storage medium according to claim 8, wherein the direction control program is configured to cause the computer to set the rate at which the first control direction is changed to approach the first input direction such that the greater a difference between the first input direction and the first control direction having been most recently updated is, the higher the rate is.

19. The non-transitory computer-readable storage medium according to claim 8, wherein the direction control program is configured to cause the computer to control a direction of a predetermined object in a virtual space, based on the first control direction.

20. The non-transitory computer-readable storage medium according to claim 8, wherein the direction control program is configured to cause the computer to obtain a two-dimensional second input direction based on an input onto an analog direction input section, and to set the second input direction as a second control direction.

* * * * *

UNITED STATES PATENT AND TRADEMARK OFFICE
CERTIFICATE OF CORRECTION

PATENT NO. : 8,425,319 B2
APPLICATION NO. : 13/277524
DATED : April 23, 2013
INVENTOR(S) : Sato et al.

Page 1 of 1

It is certified that error appears in the above-identified patent and that said Letters Patent is hereby corrected as shown below:

Title page, Column 2, Item [56] after "2010/0081507 A1* 4/2010

Finocchio 463/37", please insert:

--FOREIGN PATENT DOCUMENTS

JP 2004-000368 1/2004--

Signed and Sealed this
First Day of October, 2013

Teresa Stanek Rea
*Deputy Director of the United States Patent and Trademark Office*